(12) United States Patent
Zhang et al.

(10) Patent No.: US 12,551,310 B2
(45) Date of Patent: Feb. 17, 2026

(54) INTERVENTIONAL INSTRUMENT MANIPULATION ACCESSORY AND INTERVENTIONAL MEDICAL SYSTEM

(71) Applicant: HANGZHOU VALGEN MEDTECH CO., LTD., Zhejiang (CN)

(72) Inventors: Tingchao Zhang, Zhejiang (CN); Yang Li, Zhejiang (CN); Zehan Zhang, Zhejiang (CN); Wei Jiang, Zhejiang (CN)

(73) Assignee: HANGZHOU VALGEN MEDTECH CO., LTD., Hangzhou (CN)

( * ) Notice: Subject to any disclaimer, the term of this patent is extended or adjusted under 35 U.S.C. 154(b) by 342 days.

(21) Appl. No.: 18/338,991

(22) Filed: Jun. 21, 2023

(65) Prior Publication Data

US 2023/0346499 A1 Nov. 2, 2023

Related U.S. Application Data

(63) Continuation of application No. PCT/CN2021/142235, filed on Dec. 28, 2021.

(51) Int. Cl.
*A61B 50/24* (2016.01)
(52) U.S. Cl.
CPC .................................. *A61B 50/24* (2016.02)
(58) Field of Classification Search
CPC ....... A61B 50/24; A61B 8/4209; A61F 2/243; A61M 25/02; A61M 2025/024; A61N 5/1007; F16B 2/02; F16B 2/06; F16B 2/12
(Continued)

(56) References Cited

U.S. PATENT DOCUMENTS

| 264,923 A | 9/1882 | Burgett |
| 5,704,900 A | 1/1998 | Dobrovolny et al. |

(Continued)

FOREIGN PATENT DOCUMENTS

| CN | 101918073 A | 12/2010 |
| CN | 102028549 A | 4/2011 |

(Continued)

OTHER PUBLICATIONS

WIPO, International Search Report and Written Opinion for International Application No. PCT/CN2021/082997, Oct. 11, 2021.

(Continued)

*Primary Examiner* — Anita M King
(74) *Attorney, Agent, or Firm* — HAUPTMAN HAM, LLP

(57) ABSTRACT

An interventional instrument manipulation accessory (100) is configured to position an interventional instrument (200). The interventional instrument manipulation accessory (100) includes a support frame (10) and at least one sliding assembly (20). The interventional instrument (200) is detachably connected to the sliding assembly (20). The support frame (10) includes a guiding rod (13). The guiding rod (13) is provided with at least one rack (131) in a length direction of the guiding rod (13). The sliding assembly (20) includes a sliding block (21) and an adjusting mechanism (23) detachably disposed at the sliding block (21). The adjusting mechanism (23) includes a limiting portion (235) and a gear (234) fixedly connected to the limiting portion (235). In the case where the sliding assembly (20) is mounted at the guiding rod (13), the sliding block (21) is sleeved on the guiding rod (13).

20 Claims, 26 Drawing Sheets

(58) Field of Classification Search
USPC .......... 248/128; 600/459, 102, 606; 604/110
See application file for complete search history.

(56) References Cited

U.S. PATENT DOCUMENTS

| | | | |
|---|---|---|---|
| 5,931,786 | A | 8/1999 | Whitmore |
| 10,226,309 | B2 * | 3/2019 | Ho .................. A61B 90/50 |
| 12,102,534 | B2 * | 10/2024 | Kizuka ............... A61F 2/2466 |
| 12,186,188 | B2 * | 1/2025 | Wong ................ A61B 34/30 |
| 2004/0044310 | A1 | 3/2004 | Suzuki |
| 2004/0143188 | A1 * | 7/2004 | Barzell ............. A61B 8/4209 |
| | | | 600/439 |
| 2017/0042678 | A1 | 2/2017 | Ganesan et al. |
| 2019/0183641 | A1 | 6/2019 | Ganesan et al. |
| 2020/0345483 | A1 * | 11/2020 | Wong ............... A61M 25/02 |

FOREIGN PATENT DOCUMENTS

| | | |
|---|---|---|
| CN | 204132844 U | 2/2015 |
| CN | 105246447 A | 1/2016 |
| CN | 106308901 A | 1/2017 |
| CN | 106704783 A | 5/2017 |
| CN | 107307909 A | 11/2017 |
| CN | 208573774 U | 3/2019 |
| CN | 109567904 A | 4/2019 |
| CN | 110301965 A | 10/2019 |
| CN | 210727846 U | 6/2020 |
| CN | 111685718 A | 9/2020 |
| CN | 212490260 U | 2/2021 |
| WO | 2018145337 A1 | 8/2018 |
| WO | 2020072384 A1 | 4/2020 |
| WO | 2020223457 A1 | 11/2020 |

OTHER PUBLICATIONS

WIPO, International Search Report and Written Opinion for International Application No. PCT/CN2021/142234, Mar. 11, 2022.
WIPO, International Search Report and Written Opinion for International Application No. PCT/CN2021/142235, Apr. 2, 2022.
Extended European Search Report issued in corresponding EP application No. 21914438.3 dated Apr. 16, 2024.

* cited by examiner

INTERVENTIONAL INSTRUMENT MANIPULATION ACCESSORY AND INTERVENTIONAL MEDICAL SYSTEM

CROSS-REFERENCE TO RELATED APPLICATION(S)

The application is a continuation of International Application No. PCT/CN2021/142235, filed Dec. 28, 2021, which claims priority to Chinese Patent Application No. 202011644108.6, filed Dec. 31, 2020, and Chinese Patent Application No. 202023338413.0, filed Dec. 31, 2020, the entire disclosures of which are incorporated herein by reference.

TECHNICAL FIELD

The disclosure relates to the field of medical apparatus and instruments, and in particular, to an interventional instrument manipulation accessory and an interventional medical system.

BACKGROUND

During an interventional medical procedure, in order to ensure that the procedure can be performed safely and smoothly, an interventional instrument needs to be kept at a specific position, for example, part of the interventional instrument must be located near a patient's body or a surgical site during the medical procedure. Therefore, the interventional instrument can be stably located by various auxiliary devices.

In general, there is a need to manipulate and reposition the interventional instrument during a procedure. In many cases, one portion of the interventional instrument needs be moved relative to another portion of the interventional instrument. In the related art, an interventional instrument manipulation accessory includes a support frame and a sliding block disposed at the support frame, the interventional instrument is mounted at the sliding block, and the sliding block is provided with an adjusting mechanism for controlling movement of the sliding block, so that one portion of the interventional instrument and/or another portion of the interventional instrument can be moved. However, the existing adjusting mechanism is fixed to the sliding block through screws or other fasteners, making it difficult to disassemble and clean the adjusting mechanism.

SUMMARY

The disclosure aims to provide an interventional instrument manipulation accessory, where an adjusting mechanism is easily disassembled from a sliding block.

An interventional instrument manipulation accessory is provided in the disclosure. The interventional instrument manipulation accessory includes a support frame and at least one sliding assembly. The support frame includes a guiding rod, and the guiding rod is provided with at least one rack in a length direction of the guiding rod. Each sliding assembly includes a sliding block and an adjusting mechanism detachably disposed at the sliding block. The adjusting mechanism includes a limiting portion and a gear fixedly connected to the limiting portion. When the sliding assembly is in a case where the sliding assembly is mounted at the guiding rod, the sliding block is sleeved on the guiding rod, the gear meshes with the at least one rack, and the limiting portion is limited between the guiding rod and a side wall of the sliding block. When the sliding assembly is in a case where the sliding assembly is detached from the guiding rod, the adjusting mechanism is operable to be detached from the sliding block.

In some implementations, the sliding block defines a sliding groove and an accommodating groove in communication with the sliding groove, and the adjusting mechanism is detachably mounted in the accommodating groove. When the sliding assembly is in the case where the sliding assembly is mounted at the guiding rod, the guiding rod extends through the sliding groove, the gear is accommodated in the accommodating groove and the sliding groove and meshes with the at least one rack, and the limiting portion is rotatably accommodated in the accommodating groove.

In some implementations, a through hole is defined at one end of the accommodating groove. A blind hole is defined at the other end of the accommodating groove. The limiting portion is operable to pass through the through hole to be rotatably accommodated in the blind hole.

In some implementations, the adjusting mechanism further includes a rotating shaft. Both the limiting portion and the gear are fixed to the rotating shaft, and at least part of the rotating shaft is rotatably inserted into the accommodating groove.

In some implementations, the adjusting mechanism further includes a rotating member. One end of the rotating shaft extends out of the through hole and is connected to the rotating member, and the other end of the rotating shaft away from the rotating member is fixedly connected to the limiting portion.

In some implementations, a fitting clearance on single side between the limiting portion and the blind hole ranges from 0.02 mm to 0.15 mm. A depth of the blind hole is larger than or equal to a thickness of the limiting portion. The thickness of the limiting portion is directly proportional to the fitting clearance on single side, and the thickness of the limiting portion is greater than 1.15 mm.

In some implementations, the accommodating groove has a gear fitting hole. The gear fitting hole is in communication with the sliding groove, and the gear is operable to pass through the gear fitting hole to mesh with the at least one rack.

In some implementations, the limiting portion is cylindrical, and a diameter of the limiting portion is larger than an outer diameter of the gear.

In some implementations, the adjusting mechanism further includes a stabilizing portion fixedly connected to the gear. The gear is located between the limiting portion and the stabilizing portion, at least part of the stabilizing portion is rotatably accommodated in the through hole, and the stabilizing portion is in clearance fit with the through hole.

In some implementations, both the limiting portion and the stabilizing portion are cylindrical, a diameter of the limiting portion is larger than an outer diameter of the gear, and a diameter of the stabilizing portion is larger than the diameter of the limiting portion.

In some implementations, the adjusting mechanism further includes a stabilizing portion fixedly connected to the gear, the gear is located between the limiting portion and the stabilizing portion, and at least part of the stabilizing portion is rotatably accommodated in the through hole. The guiding rod has a first surface. The at least one rack is disposed on the first surface. The stabilizing portion is cylindrical, and an outer circumferential wall of the stabilizing portion is in rotational contact with the first surface.

In some implementations, the sliding assembly further includes a locking mechanism disposed at the sliding block.

The locking mechanism includes an abutting member, and the abutting member is operable to abut against the guiding rod to lock the sliding block with the guiding rod and is operable to move away from the guiding rod to unlock the sliding block from the guiding rod.

In some implementations, the sliding block defines a positioning hole in communication with the sliding groove. The abutting member extends through the positioning hole, and the abutting member is operable to move along an axis of the positioning hole to abut against the guiding rod or move away from the guiding rod.

In some implementations, the locking mechanism further includes an elastic member connected to the abutting member. The elastic member elastically abuts against the guiding rod.

In some implementations, the abutting member includes a mounting portion facing the sliding groove and a connection portion away from the sliding groove. The mounting portion defines a mounting hole, and the elastic member is partially accommodated in the mounting hole.

In some implementations, the locking mechanism further includes a locking member. The locking member is sleeved on the connection portion, and the locking member is fixedly connected to the abutting member, such that the locking member is rotatable synchronously with the abutting member.

In some implementations, the mounting portion is in threaded connection with the positioning hole, and is provided with a stopping structure protruding from one end of the mounting portion facing the sliding groove. The sliding block defines a stopping recess at a periphery of one end of the positioning hole facing the sliding groove. When the sliding block is locked with the guiding rod through the abutting member, the stopping structure is in close contact with the guiding rod. When the sliding block is unlocked from the guiding rod through the abutting member, the stopping structure is in close contact with a bottom surface of the stopping recess.

In some implementations, the sliding assembly further includes a holder. The holder is disposed at the sliding block and used for detachable connection with an interventional instrument.

In some implementations, the holder includes a U-shaped positioning frame. The U-shaped positioning frame is used for detachable connection with the interventional instrument. The U-shaped positioning frame has a flat inner side surface that is a vertical and a curved inner bottom surface, and a ratio of a length of the U-shaped positioning frame to a height of the U-shaped positioning frame is 3:2.

An interventional medical system is further provided in the disclosure. The interventional medical system includes an interventional instrument and the interventional instrument manipulation accessory. The interventional instrument is detachably connected to the sliding assembly.

In the interventional instrument manipulation accessory and the interventional medical system provided in the disclosure, the sliding assembly is detachably mounted at the guiding rod of the support frame, and the adjusting mechanism of the sliding assembly is detachably mounted at the sliding block. In the case where the sliding assembly is mounted at the guiding rod, the sliding block is sleeved on the guiding rod, the gear meshes with the rack, the limiting portion is limited between the guiding rod and the side wall of the sliding block, so that the adjusting mechanism only has a degree of freedom in rotation, and the adjusting mechanism cannot be detached from the sliding block. In the case where the sliding assembly is detached from the guiding rod, the limiting portion is no longer limited by the guiding rod, and the adjusting mechanism can be detached from the sliding block, so that it is easy to detach and clean the adjusting mechanism.

DETAILED DESCRIPTION

The technical solutions in implementations of the disclosure are clearly and completely described in the following in conjunction with the accompanying drawings of the disclosure. It is apparent that the described implementations are only part of the implementations of the disclosure, not all of the implementations. On the basis of the implementations of the disclosure, all other implementations obtained by those of ordinary skill in the art without creative effort shall fall within the scope of protection of the disclosure.

In addition, the following explanation of each implementation refers to illustration of an implementable specific implementation of the disclosure with reference to the accompanying drawings. The direction terms mentioned in the disclosure, such as "up", "down", "front", "back", "left", "right", "inner", "outer", and "side" are only the directions with reference to the accompanying drawings. Therefore, the used direction terms are intended to better and more clearly illustrate and understand the disclosure instead of indicating or implying that the device or element must have a specific orientation or must be constructed and operated in a specific orientation, and thus cannot be interpreted as limitation to the disclosure.

It is noted that, compared with Patent Application No. 202011644108.6 and Patent Application No. 202023338413.0, in the disclosure, "second limiting portion" is modified to "limiting portion", "first limiting portion" is modified to "stabilizing portion", "annular structure" is modified to "stopping structure", and "stepped portion" is modified to "stopping recess" for more accurate illustration.

Figure 1:
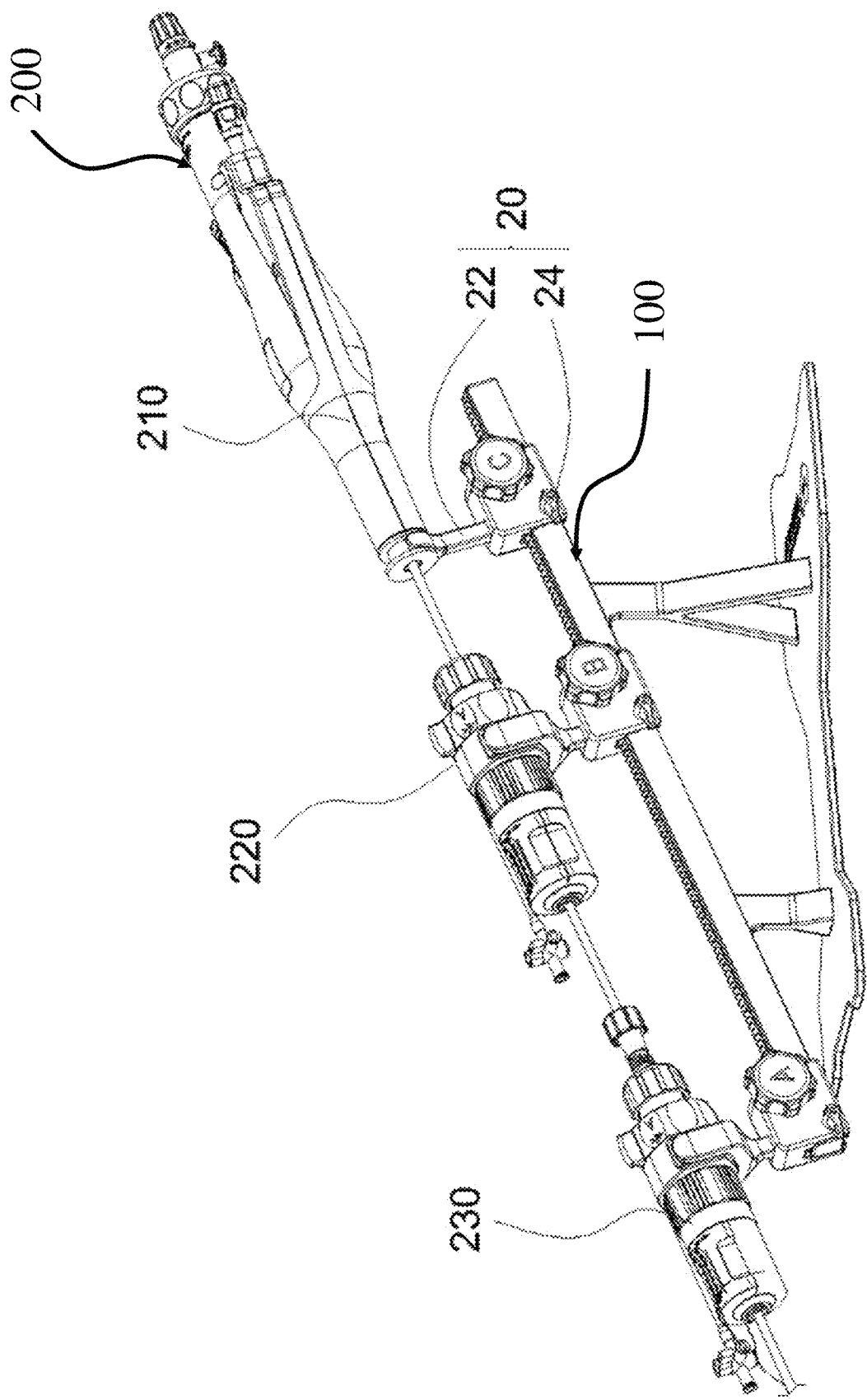
FIG. 1 is a schematic perspective structural view of an interventional medical system provided in an implementation of the disclosure.
Figure 2:
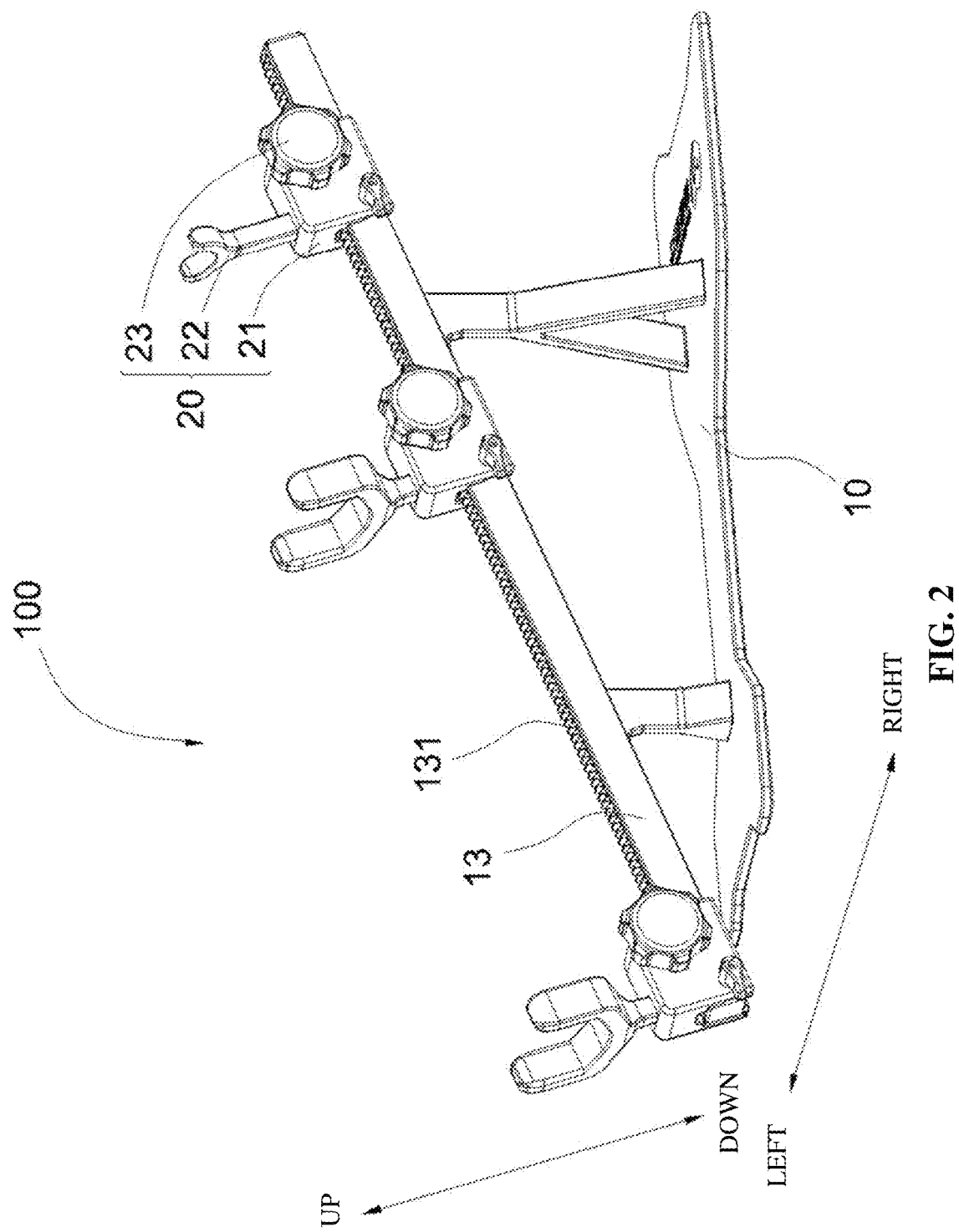
FIG. 2 is a schematic perspective structural view of an interventional instrument manipulation accessory as illustrated in FIG. 1.

Referring to FIG. 1 and FIG. 2, an interventional instrument manipulation accessory 100 and an interventional medical system are provided in an implementation of the disclosure. The interventional medical system includes an interventional instrument 200 and the interventional instrument manipulation accessory 100. The interventional instrument manipulation accessory 100 is configured to position and stably support the interventional instrument 200 during an interventional medical procedure. The interventional instrument manipulation accessory 100 includes a support frame 10 and at least one sliding assembly 20. The interventional instrument 200 is detachably connected to the sliding assembly 20. The interventional instrument 200 is detachably located at the sliding assembly 20 of the interventional instrument manipulation accessory 100. The interventional instrument 200 can be moved to a certain position (for example, to a position near a patient's body or a surgical site) by moving the sliding assembly 20. In the case where the interventional instrument 200 includes at least two portions which are movable relative to each other, each of the at least two portions may be detachably located at a corresponding sliding assembly 20 of the interventional instrument manipulation accessory 100. Each portion of the interventional instrument 200 can be moved to a certain position by moving the sliding assembly 20, thereby facilitating an interventional procedure.

In examples taken below for illustration, the interventional instrument 200 is a mitral valve clamp system. The interventional instrument 200 includes a valve clamp manipulation device 210, a bendable sheath 220, and a guiding sheath 230. The valve clamp manipulation device 210, the bendable sheath 220, and the guiding sheath 230 can move relative to one another. The valve clamp manipulation device 210, the bendable sheath 220, and the guiding sheath 230 are respectively located at different sliding assemblies 20 of the interventional instrument manipulation accessory 100. According to purposes and requirements of treatment, the interventional instrument 200 may also be in other forms and structures. Technical solutions of interventional medical systems with the interventional instrument 200 in other forms and structures and corresponding interventional instrument manipulation accessories 100 also fall into the protection scope of the disclosure.

In some implementations, there are three sliding assemblies 20. Among the three sliding assemblies 20, one sliding assembly 20 is corresponding to the valve clamp manipulation device 210, one sliding assembly 20 is corresponding to the bendable sheath 220, and one sliding assembly 20 is corresponding to the guiding sheath 230 of the interventional instrument 200. The number of the sliding assemblies 20 may be determined based on the number of portions of the interventional instrument 200 that need to be fixed to the sliding assemblies 20. The number of the sliding assemblies 20 may also be one, two, or another value. The sliding assembly 20 may be detachably mounted at the support frame 10, and different numbers of sliding assembly 20 may be mounted at the support frame 10 according to actual requirements.

Referring to FIGS. 2 to 6 together, the support frame 10 includes a guiding rod 13, and the guiding rod 13 is provided with at least one rack 131 in a length direction of the guiding rod 13. The sliding assembly 20 includes a sliding block 21 and an adjusting mechanism 23 detachably disposed at the sliding block 21. The adjusting mechanism 23 includes a limiting portion 235 and a gear 234 fixedly connected to the limiting portion 235. In the case where the sliding assembly 20 is mounted at the guiding rod 13, the sliding block 21 is sleeved on the guiding rod 13, the gear 234 meshes with the rack 131, and the limiting portion 235 is limited between the guiding rod 13 and a side wall of the sliding block 21. In the case where the sliding assembly 20 is detached from the guiding rod 13, the adjusting mechanism 23 is operable to be detached from the sliding block 21.

In the interventional instrument manipulation accessory 100 provided in the implementations of the disclosure, the sliding assembly 20 may be detachably mounted at the guiding rod 13 of the support frame 10, and the adjusting mechanism 23 of the sliding assembly 20 may be detachably mounted at the sliding block 21. In the case where the sliding assembly 20 is mounted at the guiding rod 13, the sliding block 21 is sleeved on the guiding rod 13, the gear 234 meshes with the rack 131, and the limiting portion 235 of the adjusting mechanism 23 is limited between the guiding rod 13 and the side wall of the sliding block 21, so that the adjusting mechanism 23 only has a degree of freedom in rotation, and the adjusting mechanism 23 cannot be detached from the sliding block 21. In the case where the sliding assembly 20 is detached from the guiding rod 13, the limiting portion 235 is no longer limited by the guiding rod 13, and the adjusting mechanism 23 can be detached from the sliding block 21, and thus it is easy to detach and clean the adjusting mechanism 23. Each of various portions of the interventional instrument 200, such as the valve clamp manipulation device 210, the bendable sheath 220, and the guiding sheath 230, fixed to different sliding assemblies 20 can be moved by adjusting a position of a corresponding sliding block 21 relative to the guiding rod 13 through the adjusting mechanism 23 of a corresponding sliding assembly 20.

It can be understood that, in the case where the sliding assembly 20 is mounted at the guiding rod 13, the sliding block 21 is sleeved on the guiding rod 13, and the gear 234 of the adjusting mechanism 23 meshes with the rack 131 of the guiding rod 13. The gear 234 meshes with the rack 131 and rotates to move along the rack 131, such that the limiting portion 235 is rotated to have a tendency to move in the length direction of the guiding rod 13, and a pushing force in the length direction of the guiding rod 13 is applied to the sliding block 21 to push the sliding assembly 20 to move in the length direction of the guiding rod 13. Therefore, an amount of movement of the sliding assembly 20 can be adjusted by controlling an amount of rotation of the gear 234, thereby avoiding excessive movement of the sliding assembly 20.

In this case, the limiting portion 235 of the adjusting mechanism 23 is limited between the guiding rod 13 and the side wall of the sliding block 21, so that the adjusting mechanism 23 only has a degree of freedom in rotation at the sliding block 21 and cannot be detached from the sliding block 21, thereby effectively preventing the adjusting mechanism 23 from falling off. In this way, the limiting portion 235 is limited by the sliding block 21 and the guiding rod 13, so that movement of the sliding block 21 can be effectively controlled by the adjusting mechanism 23. When no force is applied to rotate the adjusting mechanism 23, the sliding assembly 20 remains stationary relative to the guiding rod 13, and thus an undesired movement of the interventional instrument 200 can be prevented, thereby ensuring smooth operation of a procedure, and reducing the risk of the procedure. In the case where the sliding assembly 20 is detached from the guiding rod 13, the limiting portion 235 is no longer limited by the guiding rod 13, and the adjusting mechanism 23 can be detached from the sliding block 21, which facilitates cleaning and disinfecting of the adjusting mechanism 23 after a procedure.

In some implementations, the limiting portion 235 is in clearance fit with the guide-slid rod 13, and the limiting portion 235 is in clearance fit with the side wall of the sliding block 21, so that rotation and movement of the adjusting mechanism 23 are relatively stable. A fitting clearance between the limiting portion 235 and the guiding rod 13 may range from 0.02 mm to 0.15 mm (preferably, 0.05 mm to 0.1 mm), and a fitting clearance between the limiting portion 235 and the side wall of the sliding block 21 may range from 0.02 mm to 0.15 mm (preferably, 0.05 mm to 0.1 mm), and thus not only a relatively large fitting clearance can be avoided to avoid shaking of the limiting portion 235, but also movement of the limiting portion 235 together with the gear 234 is not limited. In other implementations, there may also be a certain distance between the limiting portion 235 and the guiding rod 13 and a certain distance between the limiting portion 235 and the side wall of the sliding block 21, as long as it is ensured that movement of the limiting portion 235 can push the sliding block 21 to move.

In some implementations, the guiding rod 13 is provided with one rack 131 in the length direction of the guiding rod 13. Correspondingly, the adjusting mechanism 23 of the sliding assembly 20 is provided with one gear 234 that meshes with the rack 131. The guiding rod 13 may also be provided with multiple racks 131 in the length direction of the guiding rod 13. Correspondingly, the adjusting mechanism 23 of the sliding assembly 20 may be provided with multiple gears 234, and each of the multiple gears 234 meshes with one of the multiple racks 131.

Figure 3:
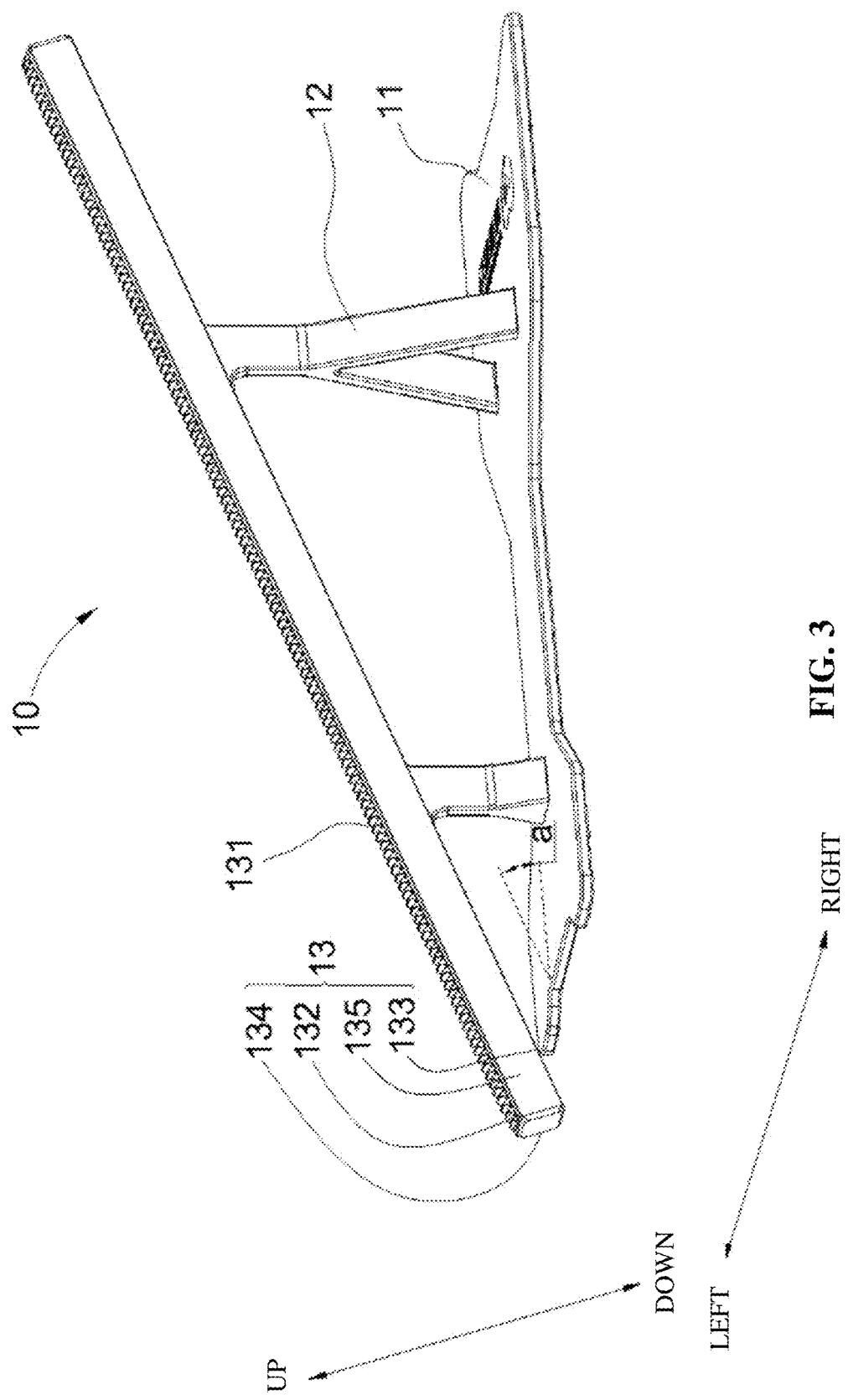
FIG. 3 is a schematic perspective structural view of a support frame as illustrated in FIG. 2.

Referring to FIG. 3, the support frame 10 further includes a bottom plate 11 and two connection posts 12 disposed at the bottom plate 11. One of the two connection posts 12 is different from the other one of the two connection posts 12 in height. The guiding rod 13 is connected to ends of the connection posts 12 away from the bottom plate 11, so that the guiding rod 13 is inclined relative to the bottom plate 11, to achieve a relatively good puncture angle of the interventional instrument 200. The guiding rod 13, the bottom plate 11, and the connection posts 12 may be fixedly connected in a non-detachable manner such as by welding or adhesives, or may be fixedly connected in a detachable manner such as by clamping or screwing, so that an extension portion of the bottom plate 11 and an extension portion of the guiding rod 13 form a nonadjustable included angle a there between. The included angle a may be determined according to a relatively good puncture angle for a procedure, and the included angle a ranges from 15 degrees to 20 degrees. In some implementations, the included angle a is 18 degrees. The included angle α between the bottom plate 11 and the guiding rod 13 may be designed to be adjustable, for example, adjustment of the included angle a is realized by adjustment of the height of the connection post 12.

As illustrated in FIG. 3, the guiding rod 13 provides with an upper surface 132 away from the bottom plate 11, a lower surface 133 facing the bottom plate 11, and a left surface 134 and a right surface 135 at two opposite sides of the upper surface 132. The rack 131 may be disposed on the upper surface 132, the lower surface 133, the left surface 134, or the right surface 135. In some implementations, the rack 131 is disposed on the upper surface 132 of the guiding rod 13, and the rack 131 extends to two opposite ends of the guiding rod 13 in the length direction of the guiding rod 13. As an example, the rack 131 is disposed on the upper surface 132 of the guiding rod 13, and a specific structure of the sliding assembly 20 is described in detail as follows.

Figure 4:
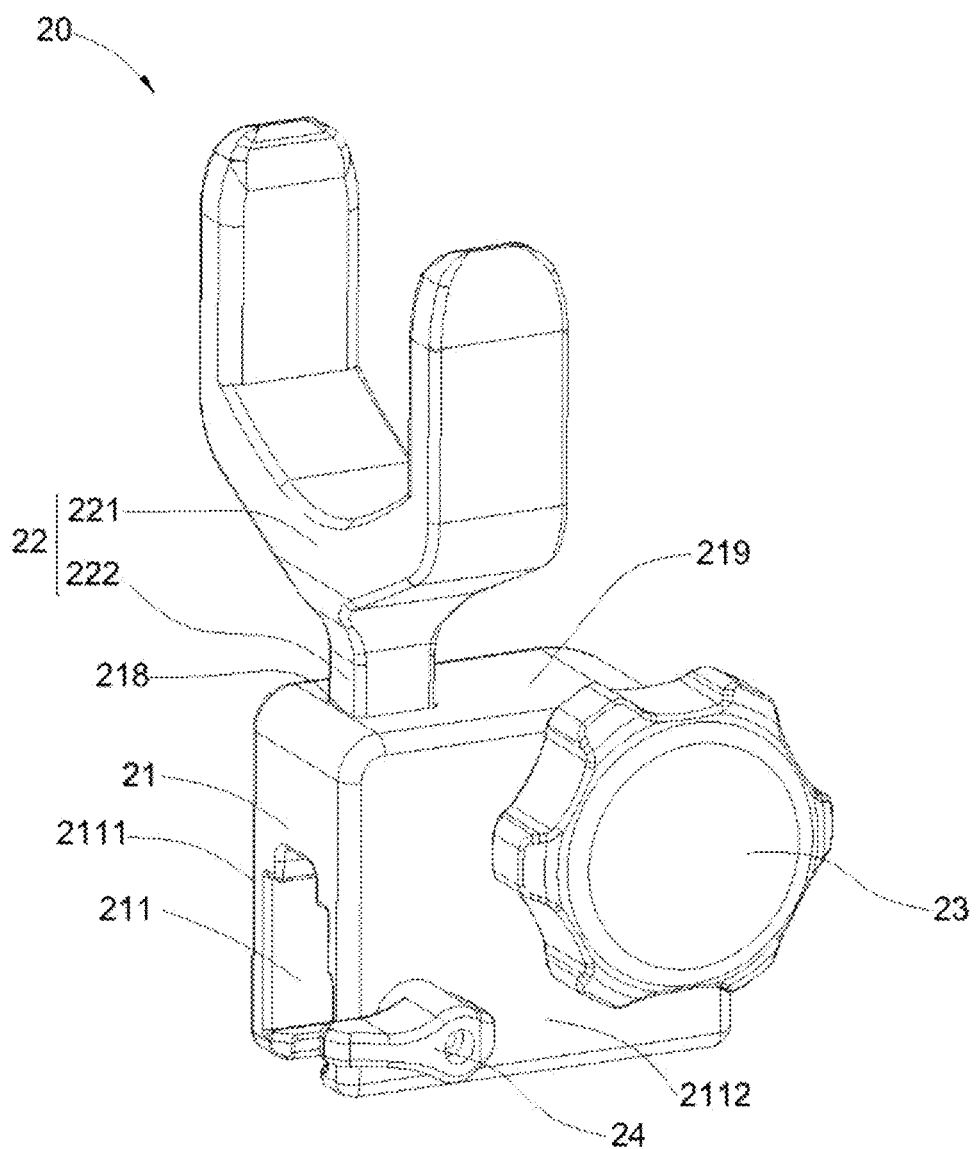
FIG. 4 is a schematic perspective structural view of a sliding assembly as illustrated in FIG. 2.
Figure 5:
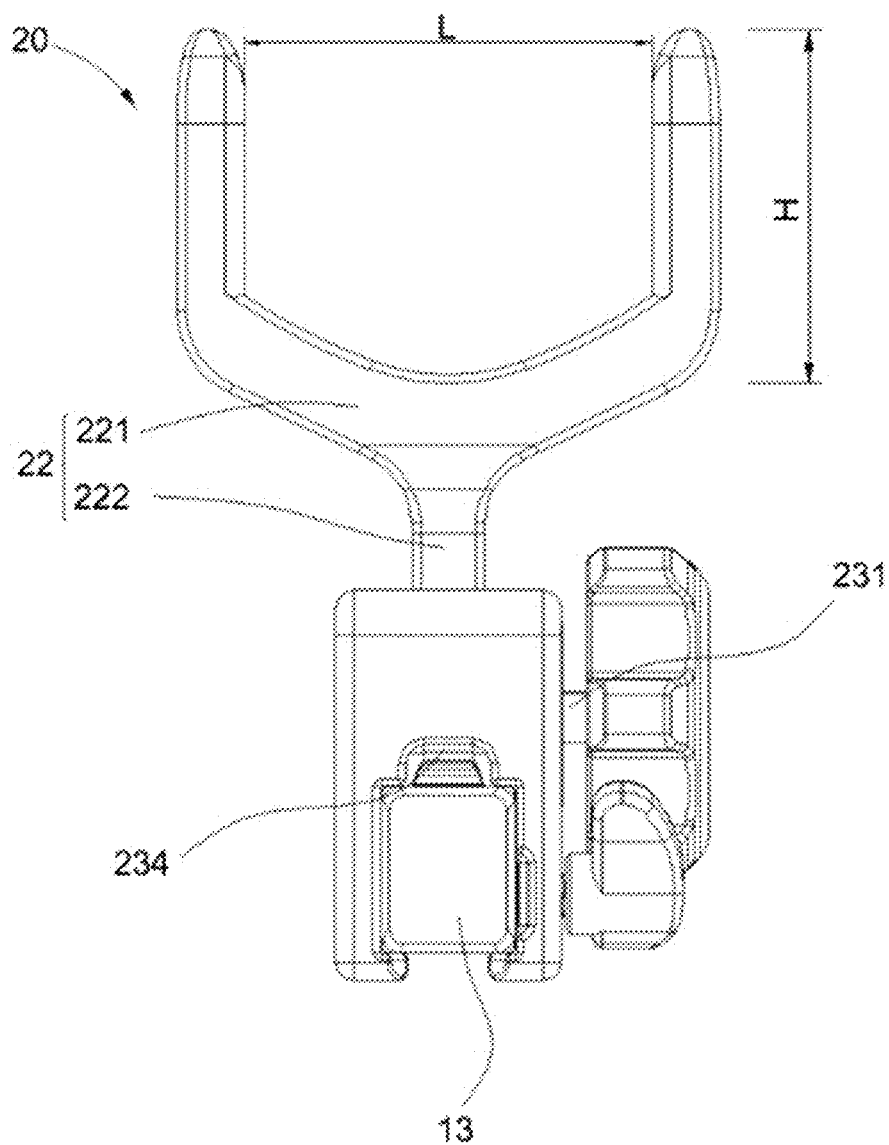
FIG. 5 is a side view of the sliding assembly as illustrated in FIG. 4.
Figure 6:
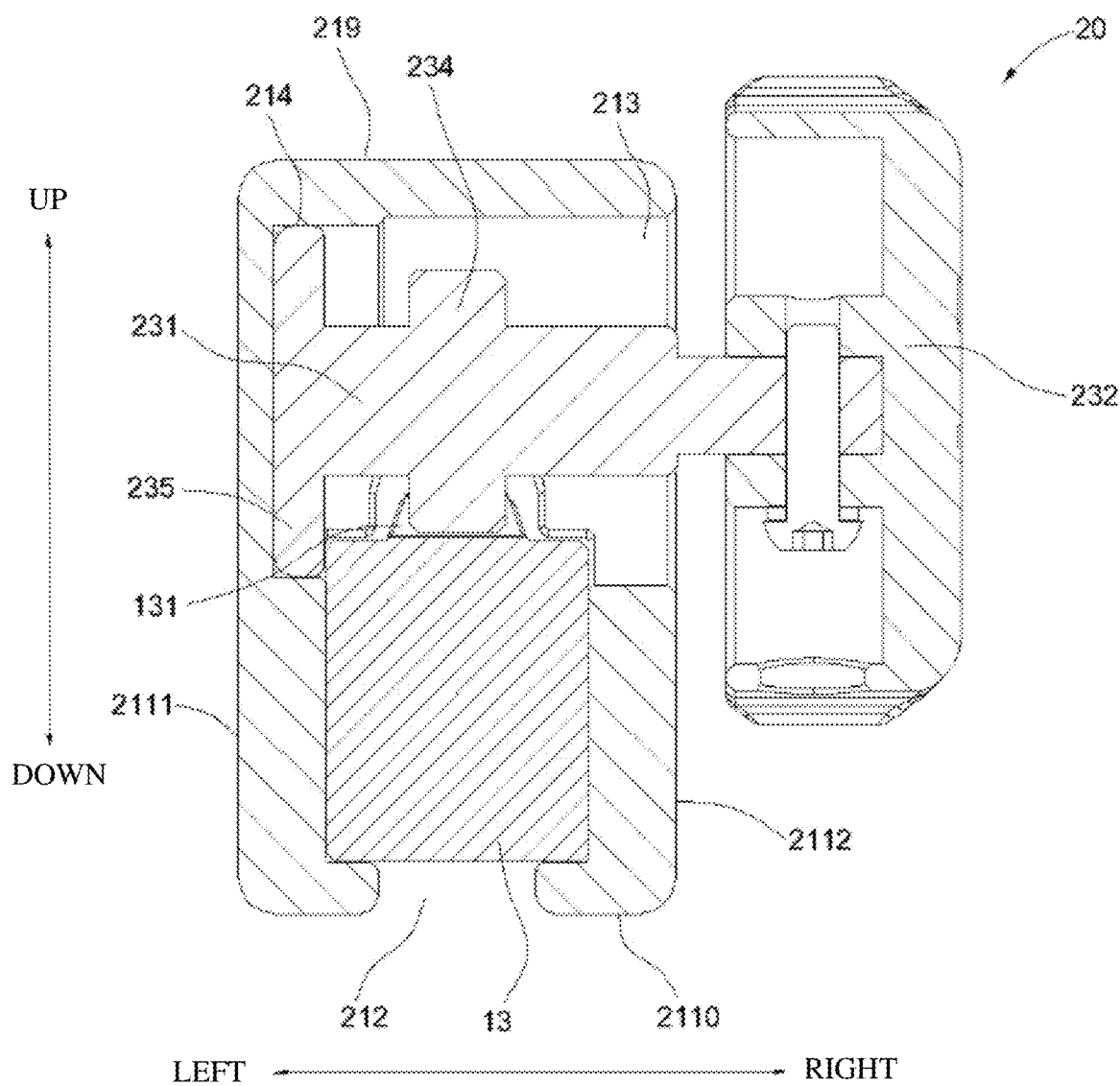
FIG. 6 is a cross-sectional view of the sliding assembly as illustrated in FIG. 4.

Referring to FIGS. 4 to 6 together, the sliding block 21 is rectangular and includes an upper side wall 219, a lower side wall 2110 opposite the upper side wall 219, a left side wall 2111 at a left side of the upper side wall 219, a right side wall 2112 at a right side of the upper side wall 219, and two end walls opposite each other. The sliding block 21 may be made of a plastic material or a metal material. The sliding block 21 defines a sliding groove 211. In the case where the sliding assembly 20 is mounted at the guiding rod 13, the guiding rod 13 extends through the sliding groove 211. Specifically, the sliding groove 211 extends through two end walls of the sliding block 21 that are opposite to each other, a cross-section of the sliding groove 211 is in the shape of the Chinese character "凸" (pronounced "tū"), and the sliding block 21 is sleeved on the guiding rod 13 through the sliding groove 211. In addition, the height of the first tooth of the rack 131 adjacent to one end of the rack 131 is lower than the height of other teeth of the rack 131, which facilitates the guiding rod 13 to be introduced into the sliding block 21.

It is noted that, the guiding rod 13 extends through the sliding groove 211 of the sliding block 21, and the sliding block 21 can move along the guiding rod 13, and thus the guiding rod 13 needs to be in clearance fit with inner surfaces of four side walls of the sliding block 21 to ensure smooth movement of the sliding block 13. A fitting clearance between the guiding rod 13 and each of the inner surfaces of the four side walls of the sliding block 21 may range from 0.02 mm to 0.15 mm (preferably, 0.05 mm to 0.1 mm), and thus a relatively large distance between the guiding rod 13 and each of the inner surfaces of the four side walls of the sliding block 21 can be avoided to avoid shaking of the sliding block 21 during movement of the sliding block 21 on the guiding rod 13.

Further, the lower side wall 2110 of the sliding block 21 defines an opening 212 in an extending direction of the sliding groove 211. The opening 212 is in communication with the sliding groove 211. A dimension of the opening 212 in a width direction of the guiding rod 13 is larger than a dimension of one end of the connection post 12 connected to the guiding rod 13 in the width direction of the guiding rod 13, so that the sliding block 21 can move on the guiding rod 13 without being stopped by the connection post 12, enabling the sliding assembly 20 to move throughout the whole guiding rod 13. In the case where the sliding block 21 is made of a plastic material, the sliding block 21 may be deformed under a force. During mounting of the sliding assembly 20 to the guiding rod 13, the guiding rod 13 may slightly widen the opening 212 of the sliding block 21, resulting in a slight increase in the width of the sliding groove 211, and thus the guiding rod 13 is easy to extend through the sliding groove 211, which facilitates mounting of the sliding assembly 20.

In other implementations, the lower side wall 2110 of the sliding block 21 may be closed. The sliding block 21 of the sliding assembly 20 may be first sleeved on the guiding rod 13, and then the guiding rod 13 is fixedly connected to the connection post 12. In this case, the guiding rod 13 is fixedly connected to the connection post 12 in a detachable manner.

Referring to FIG. 4 and FIG. 5, the sliding assembly 20 further includes a holder 22. The holder 22 is disposed at the sliding block 21 and used for detachable connection with the interventional instrument 200. Specifically, the sliding block 21 defines a holder mounting hole 218 on an upper side wall 219 of the sliding block 21. The holder mounting hole 218 is configured to mount the holder 22. The holder 22 may be fixedly connected to the upper side wall 219 of the sliding block 21 via a fastener such as a screw or a pin, facilitating easy replacement of holders 22 of different models. The holder 22 may also be fixedly connected to the upper side wall 219 of the sliding block 21 by means of welding or adhesives. The holder 22 may be made of a metal material or a polymer material. Alternatively, a main body of the holder 22 may be made of a metal material, but a surface of the holder 22 in contact with the interventional instrument 200 may be covered with a polymer anti-skid layer such as rubber, silica gel or the like.

Further, the holder 22 includes a U-shaped positioning frame 221 and a connection rod 222 connected to one end of the U-shaped positioning frame 221. The U-shaped positioning frame 221 is used for detachable connection with the interventional instrument 200. The connection rod 222 is detachably connected to the holder mounting hole 218. The U-shaped positioning frame 221 has a flat inner side surface that is vertical and a curved inner bottom surface, and a ratio (L:H) of a length of the U-shaped positioning frame 221 to a height of the U-shaped positioning frame 221 is 3:2. The U-shaped positioning frame 221 match the corresponding components of the interventional instrument 200 in terms of shape and size to prevent the interventional instrument 200 from rotating, and the curved inner bottom surface can be adapted to and support various types of interventional instruments 200, realizing good compatibility. The U-shaped positioning frame 221 may be replaced with a V-shaped positioning frame or a C-shaped positioning frame.

Figure 7:
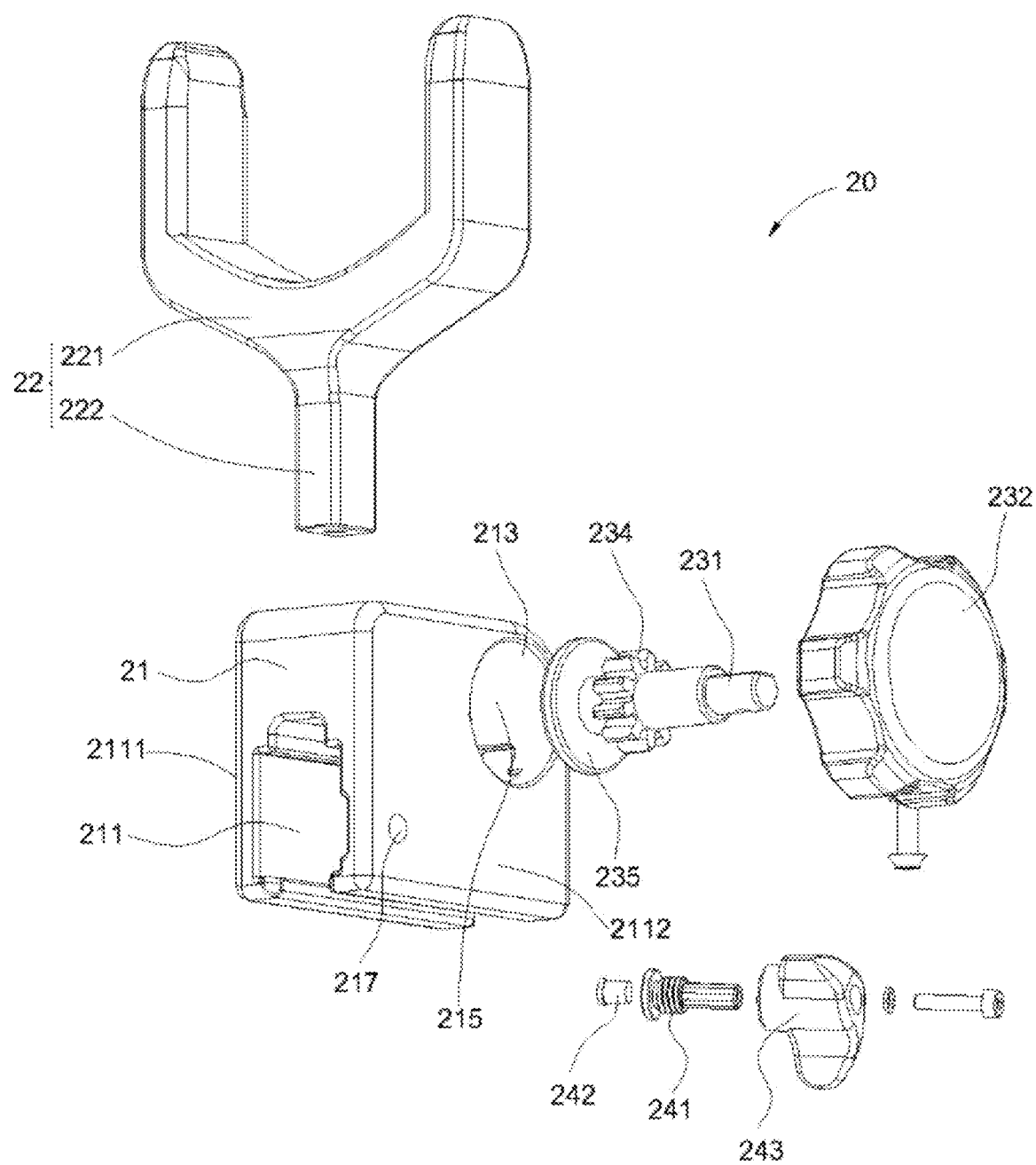
FIG. 7 is a schematic perspective exploded structural view of the sliding assembly as illustrated in FIG. 4.
Figure 8:
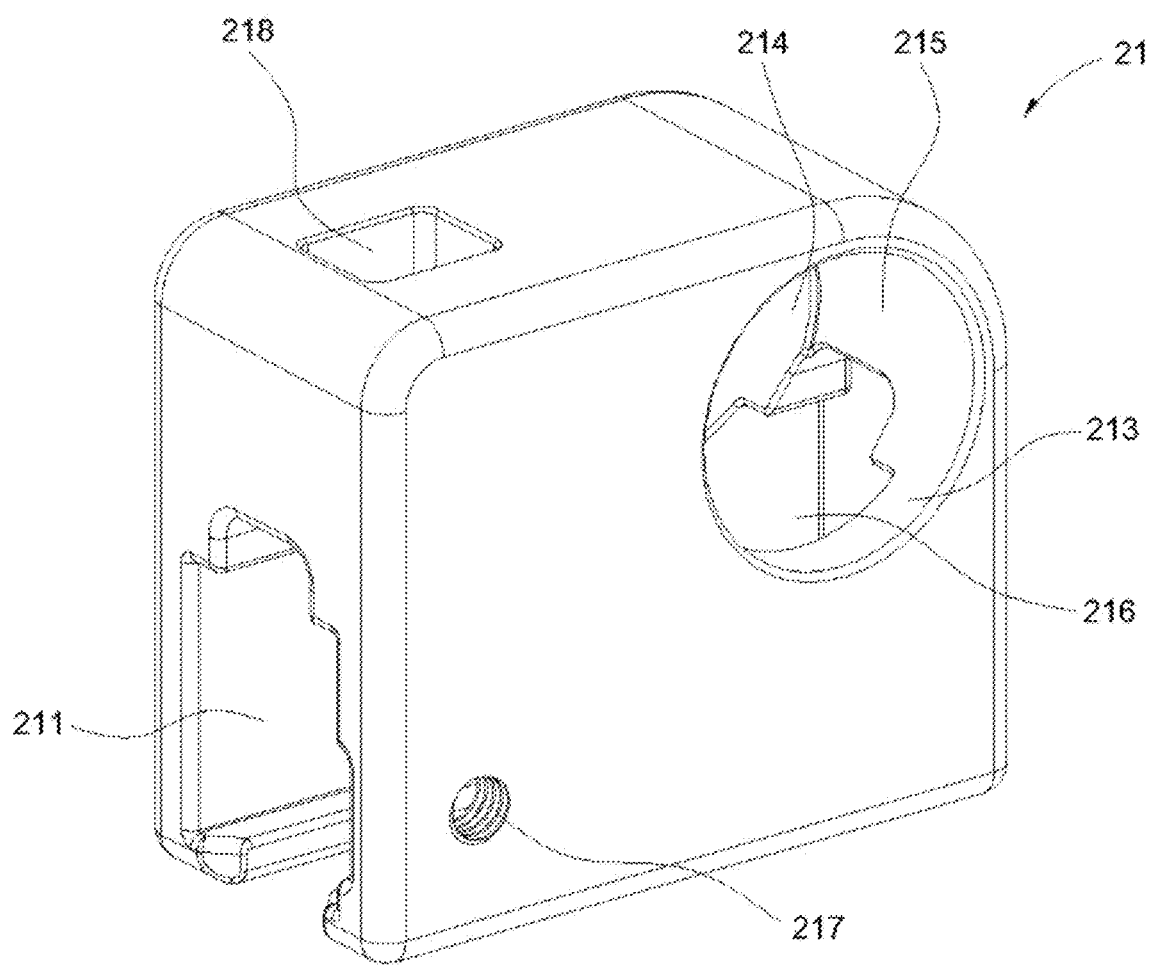
FIG. 8 is a schematic perspective structural view of a sliding block as illustrated in FIG. 4.
Figure 9:
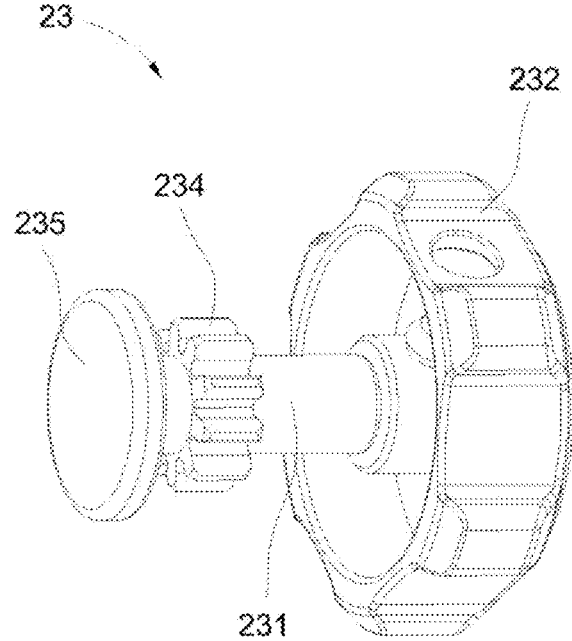
FIG. 9 is a schematic perspective structural view of an adjusting mechanism as illustrated in FIG. 4.
Figure 10:
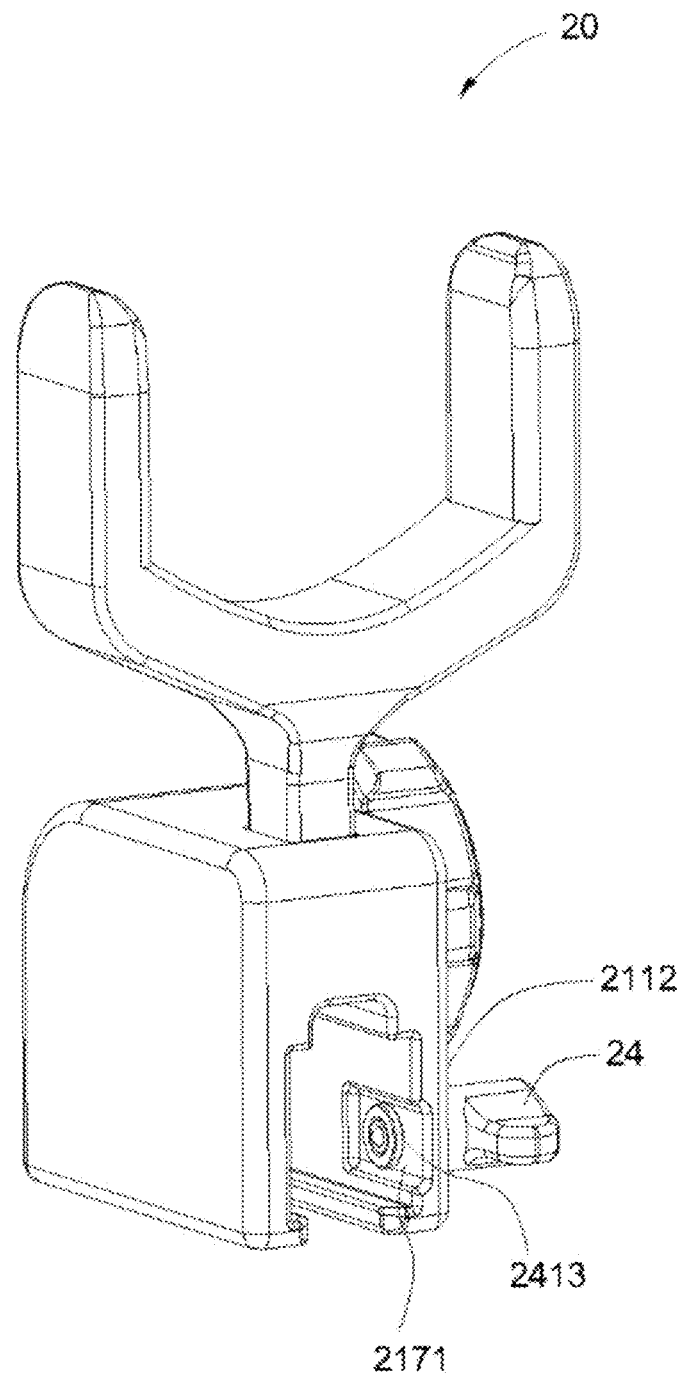
FIG. 10 is a schematic perspective structural view of the sliding assembly as illustrated in FIG. 4, viewed from another direction.
Figure 11:
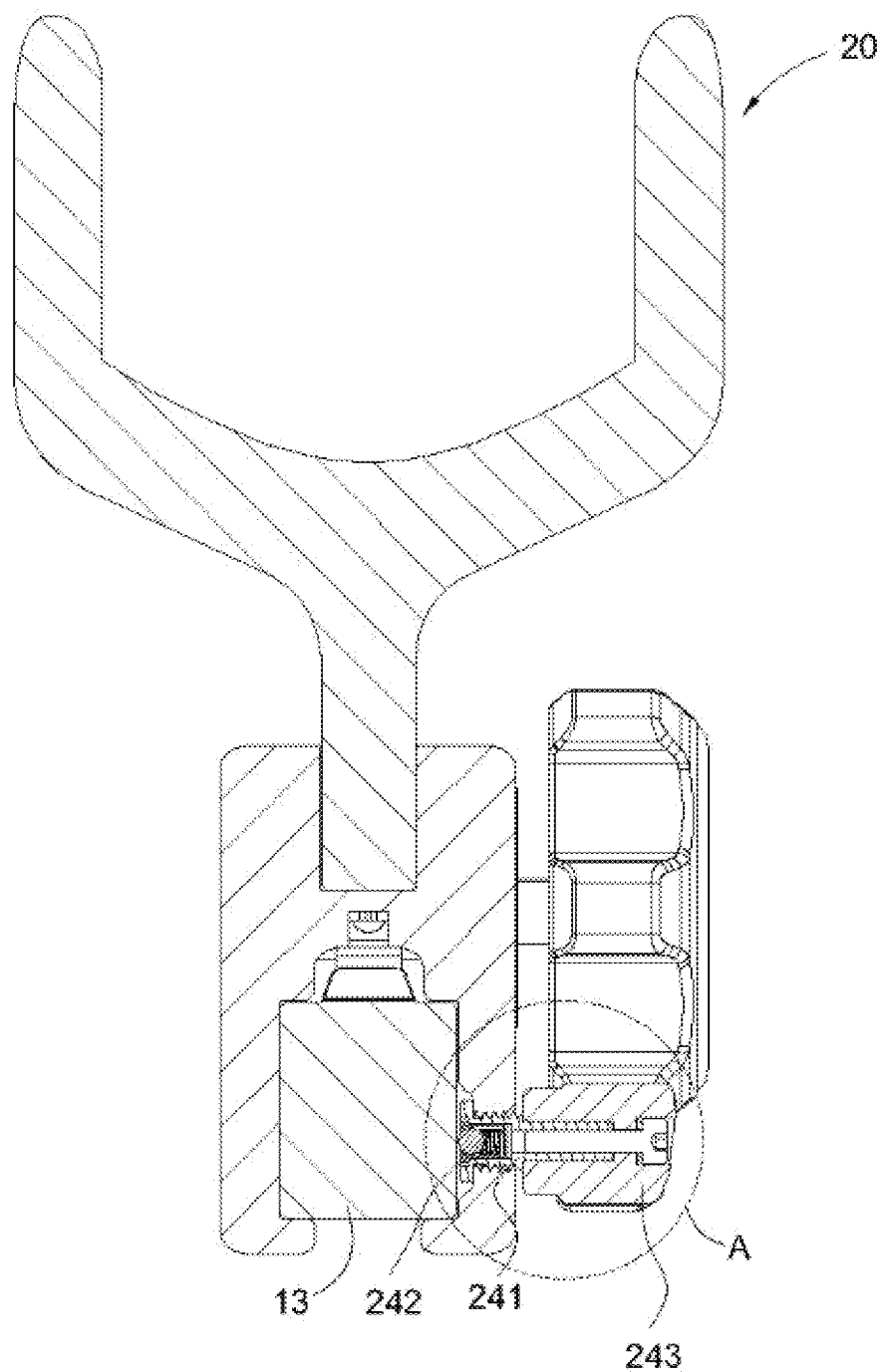
FIG. 11 is a cross-sectional view of the sliding assembly as illustrated in FIG. 4, where the sliding assembly is in an unlocked state.

Refer to FIGS. 7 to 9 together, the sliding block 21 further defines an accommodating groove 215 in communication with the sliding groove 211. The adjusting mechanism 23 is detachably mounted in the accommodating groove 215. In the case where the sliding assembly 20 is mounted at the guiding rod 13, the guiding rod 13 extends through the sliding groove 211, the gear 234 is accommodated in the accommodating groove 215 and the sliding groove 211 and meshes with the rack 131, and the limiting portion 235 is rotatably accommodated in the accommodating groove 215. Specifically, the accommodating groove 215 defines a gear fitting hole 216. The gear fitting hole 216 is in communication with the sliding groove 211. The gear 234 is operable to pass through the gear fitting hole 216 to mesh with the rack 131. The accommodating groove 215 is in communication with the sliding groove 211 through the gear fitting hole 216, so that during mounting of the adjusting mechanism 23 to the accommodating groove 215, the gear 234 can pass through the gear fitting hole 216 to be received in the sliding groove 211. In the case where the sliding assembly 20 is mounted at the guiding rod 13, the limiting portion 235 is limited between the guiding rod 13 and the side wall of the sliding block 13, and the gear 234 meshes with the rack 131. The gear 234 meshes with the rack 131 and rotates to move along the rack 131, such that the limiting portion 235 is rotated in the accommodating groove 215 and has a tendency to move in the length direction of the guiding rod 13. The accommodating groove 215 limits movement of the limiting portion 235, and thus the limiting portion 235 can push the sliding block 21 in the length direction of the guiding rod 13, so that the sliding assembly 20 can move on the guiding rod 13, thereby moving a movable portion of the interventional instrument 200. In the case where the sliding assembly 20 is detached from the guiding rod 13, the adjusting mechanism 23 is no longer limited by the guiding rod 13, and the adjusting mechanism 23 can be detached from the accommodating groove 215, so that disassembling and mounting of the adjusting mechanism 23 are simple and convenient.

Referring to FIG. 8, a through hole 213 is defined at one end of the accommodating groove 215, and a blind hole 214 is defined at the other end of the accommodating groove 215. Specifically, the through hole 213 is defined at the right side wall 2112 of the sliding block 21, and the blind hole 214 is defined at the left side wall 2111 of the sliding block 21, and an axis of the through hole 213 coincides with an axis of the blind hole 214. The through hole 213 is in communication with both the blind hole 214 and the sliding groove 211. When the adjusting mechanism 23 is mounted at the sliding block 21, the limiting portion 235 can pass through the through hole 213 to be rotatably accommodated in the blind hole 214, and the gear 234 is located between the through hole 213 and the blind hole 214 and partially received in the sliding groove 211.

It can be understood that the blind hole 214 provides a space for mounting the limiting portion 235, and also supports and limits the limiting portion 235, simplifying the sliding block 21 and the adjusting mechanism 23 in structure. The limiting portion 235 may be partially accommodated in the blind hole 214. On the premise that the guiding rod 13 is in clearance fit with the left side wall 2111 of the sliding block 21, the limiting portion 235 is entirely accommodated in the blind hole 214 and is limited between the guiding rod 13 and the left side wall 2111 of the sliding block 21. In some implementations, a depth (that is, a length) of the blind hole 214 is equal to a thickness of the limiting portion 235, and thus the limiting portion 235 is entirely accommodated in the blind hole 214, and an end face of the limiting portion 235 close to the gear 234 is flush with the inner surface of the left side wall 211 of the sliding block 21. The limiting portion 235 can pass through the through hole 213 and then be accommodated in the blind hole 214, so that it is flexible and convenient to mount and detach the adjusting mechanism 23. The limiting portion 235 is in clearance fit with the blind hole 214, so that rotation of the limiting portion 235 in the blind hole 214 is relatively stable, and at the same time, the gear 234 also meshes with and rotates relative to the rack 131 stably. Specifically, the fitting clearance on single side between the limiting portion 235 and the blind hole 214 ranges from 0.02 mm to 0.15 mm. In some implementations, the fitting clearance on single side between the limiting portion 235 and the blind hole 214 ranges from 0.05 mm to 0.1 mm. In other implementations, the blind hole 214 may be defined at the right side wall 2112 of the sliding block 21, and the through hole 213 may be defined at the left side wall 2111 of the sliding block 21.

Referring to FIGS. 6 to 9 together, the adjusting mechanism 23 further includes a rotating shaft 231. Both the limiting portion 235 and the gear 234 are fixed to the rotating shaft 231, and at least part of the rotating shaft 231 is rotatably inserted into the accommodating groove 215. In some implementations, the limiting portion 235 and the gear 234 may be fixedly sleeved on the rotating shaft 231 by welding. The limiting portion 235 and the gear 234 are coaxial and rotate along with rotation of the rotating shaft 231. In other implementations, the limiting portion 235 and the gear 234 may be fixedly mounted at the rotating shaft 231 via bearings or in other fitting manners, so that the limiting portion 235 and the gear 234 rotate together with the rotating shaft 231.

The adjusting mechanism 23 further includes a rotating member 232. One end of the rotating shaft 231 extends out of the through hole 213 and is connected to the rotating member 232, and the other end of the rotating shaft 231 away from the rotating member 232 is fixedly connected to the limiting portion 235. In this way, in the case where the sliding assembly 20 is mounted at the guiding rod 13, the rotating member 232 is located outside the through hole 213 and spaced apart from the right side wall 2112 of the sliding block 21. Rotation of the rotating member 232 may drive the gear 234 meshed with the rack 131 and the limiting portion 235 to rotate, so that the sliding assembly 20 can move on the rack 131. The rotating member 232 may be a knob, and the knob may be fixed to the rotating shaft 231 via a screw. One end of the rotating shaft 231 on which the knob is mounted has at least one flat surface, the knob is sleeved on the rotating shaft 231, the knob has another flat surface on which a mounting hole is defined, and the two flat surfaces match with each other so that when the rotating shaft 231 is connected to the knob, the rotating shaft 231 and the knob do not rotate relative to each other, thereby facilitating assembly.

Referring to FIG. 6, the limiting portion 235 is cylindrical, and a diameter of the limiting portion 235 is larger than an outer diameter of the gear 234. Specifically, a radius of the gear 234 is smaller than a distance from an axis of the rotating shaft 231 to the upper surface 132 of the guiding rod 13, and a radius of the limiting portion 235 is larger than the distance from the axis of the rotating shaft 231 to the upper surface 132 of the guiding rod 13. Therefore, in the case where the sliding assembly 20 is mounted at the guiding rod 13, the limiting portion 235 is located between a bottom surface of the blind hole 214 and the left surface 134 of the guiding rod 13, and thus the limiting portion 235 is prevented from moving along the axis of the rotating shaft 231, but rotation of the limiting portion 235 along with the rotation of the gear 234 is not limited, thereby allowing the sliding block 21 to move in the length direction of the guiding rod 13.

Figure 12:
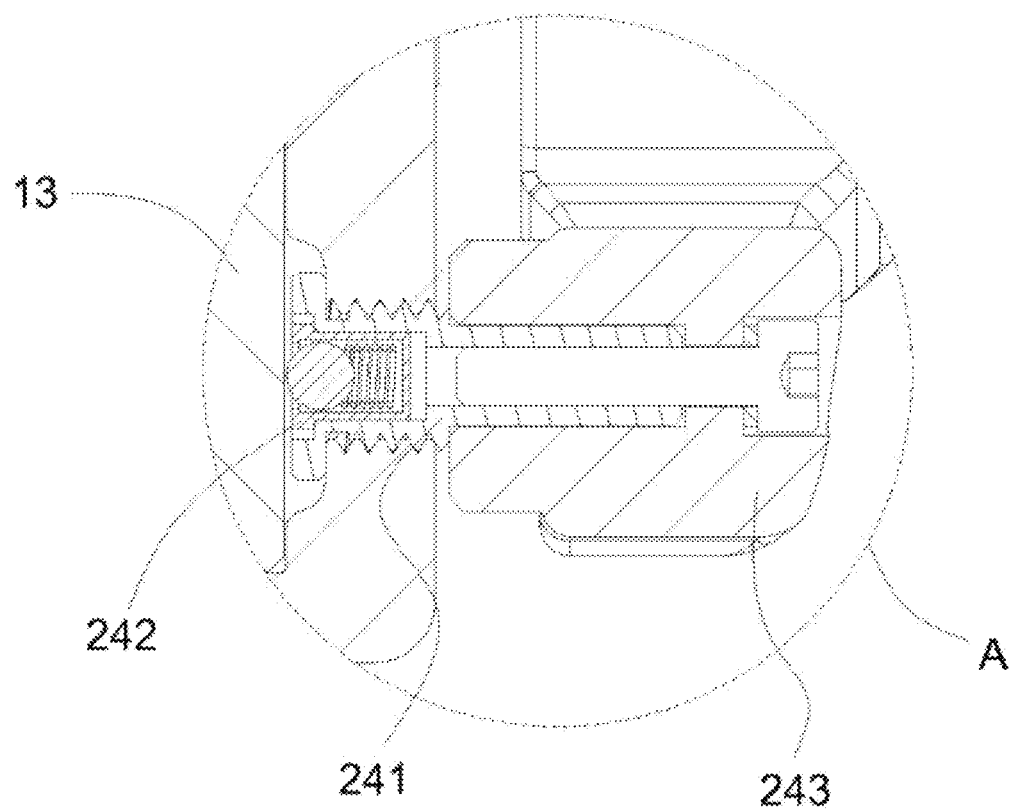
FIG. 12 is a partial enlarged view of region A as illustrated in FIG. 11.
Figure 13:
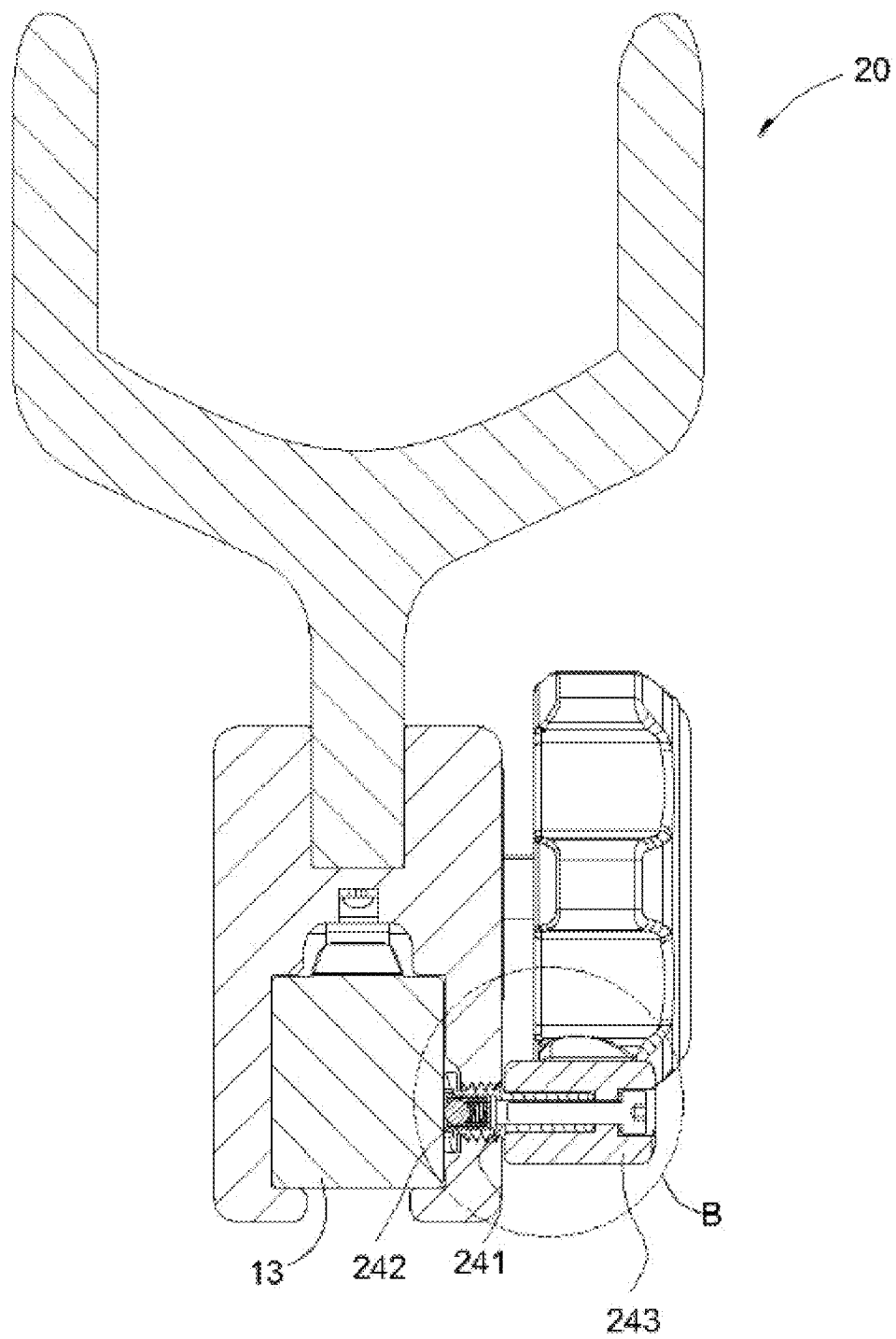
FIG. 13 is a cross-sectional view of the sliding assembly as illustrated in FIG. 4, where the sliding assembly is in a locked state.
Figure 14:
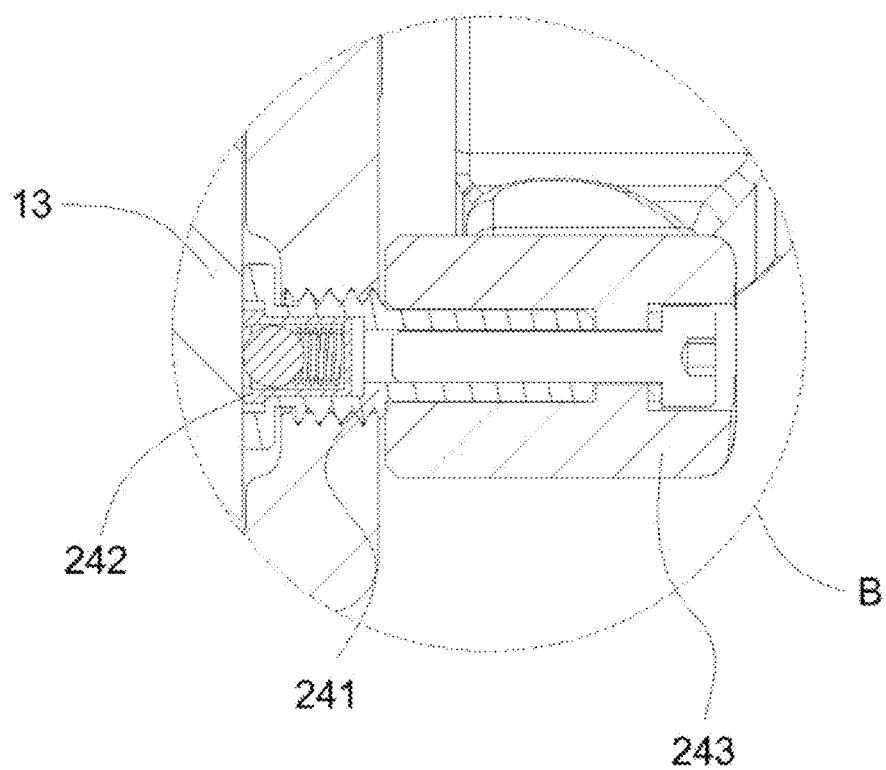
FIG. 14 is a partial enlarged view of region B as illustrated in FIG. 13.

Referring to FIGS. 10 to 14, the sliding assembly 20 further includes a locking mechanism 24 disposed at the right side wall 2112 of the sliding block 21. The locking mechanism 24 includes an abutting member 241. The abutting member 241 is operable to abut against the guiding rod 13 to lock the sliding block 21 with the guiding rod 13 and is operable to move away from the guiding rod 13 to unlock the sliding block 21 from the guiding rod 13. As illustrated in FIG. 12, the abutting member 241 is away from the guiding rod 13, and the sliding block 21 is in an unlocked state. As illustrated in FIG. 14, the abutting member 241 abuts against the guiding rod 13, and the sliding block 21 is in a locked state. It can be understood that, the locking mechanism 24 is configured to fix the sliding assembly 20 at the current position when the sliding assembly 20 moves to a desired position, and thus the sliding assembly 20 cannot further move, so that the interventional instrument 200 can be effectively fixed, and an undesired movement of the interventional instrument 200 that may affect normal operation of a procedure can be prevented.

Specifically, the sliding block 21 defines a positioning hole 217 at the right side wall 2112. The positioning hole 217 is in communication with the sliding groove 211. The abutting member 241 extends through the positioning hole 217, and the abutting member 241 is operable to move along an axis of the positioning hole 217 to abut against or move away from the guiding rod 13. It can be understood that the abutting member 241 has threads. The abutting member 241 is in threaded connection with the positioning hole 217. When the sliding assembly 20 needs to be fixed, a screwing depth of the abutting member 241 in the positioning hole 217 can be controlled to enable the abutting member 241 to abut against the guiding rod 13, so that movement of the sliding block 21 can be prevented. The locking mechanism 24 may also be disposed at the left side wall 2111 of the sliding block 21, and correspondingly, the positioning hole 217 may be defined at the left side wall 2111 of the sliding block 21.

Figure 15:
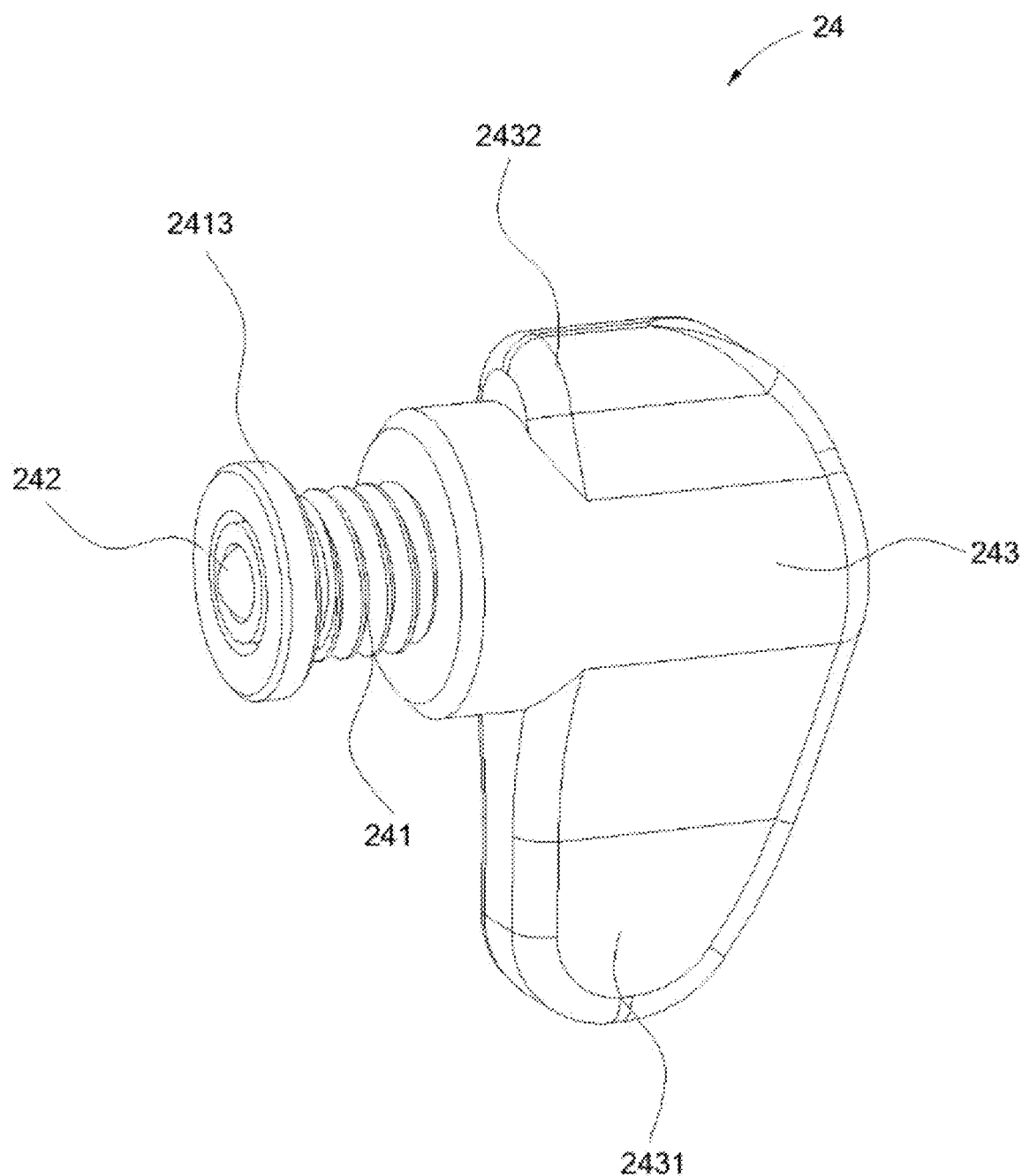
FIG. 15 is a schematic perspective structural view of the locking mechanism as illustrated in FIG. 4.
Figure 16:
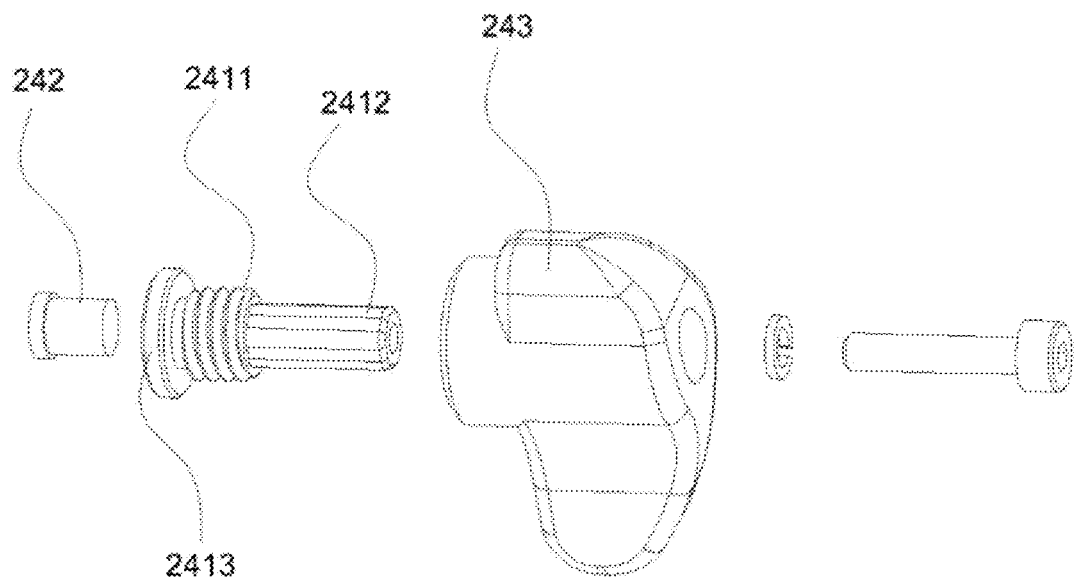
FIG. 16 is a schematic perspective exploded structural view of the locking mechanism as illustrated in FIG. 15.

Referring to FIG. 15 and FIG. 16, the locking mechanism 24 further includes an elastic member 242 connected to the abutting member 241. In the case where the sliding assembly 20 is mounted at the guiding rod 13, the elastic member 242 elastically abuts against the guiding rod 13. In some implementations, the elastic member 242 is a spring plunger. Because the sliding block 21 is movable on the guiding rod 13, a fitting clearance is reserved between the sliding block 21 and the guiding rod 13, the spring plunger at one end of the abutting member 241 provides an elastic force to abut against the guiding rod 13, and also provides a certain frictional resistance, thereby preventing the sliding assembly 20 from falling freely from the support frame 10, and reducing a shaking amplitude of the sliding block 21 on the support frame 10.

Further, the abutting member 241 includes a mounting portion 2411 facing the sliding groove 211 and a connection portion 2412 away from the sliding groove 211. The mounting portion 2411 is movably inserted into the positioning hole 217, and the connection portion 2412 is connected to one end of the mounting portion 2411 away from the sliding groove 211. The mounting portion 2411 defines a mounting hole at one end of the mounting portion 2411 facing the sliding groove 211 to mount the elastic member 242, and the elastic member 242 is partially accommodated in the mounting hole of the mounting portion 2411. The elastic member 242 is in interference fit with the mounting hole, thereby ensuring that the elastic member 242 will not fall out of the mounting hole. The threads of the abutting member 241 are on an outer surface of the mounting portion 2411, and the mounting portion 2411 is in threaded connection with the positioning hole 217.

Referring to FIGS. 10 to 14, the mounting portion 2411 is provided with a stopping structure 2413 protruding from one end of the mounting portion 2411 facing the sliding groove 211. The stopping structure 2413 may be, but is not limited to, annular. An outer diameter of the stopping structure 2413 is larger than an inner diameter of the positioning hole 217. In some implementations, the stopping structure 2413 is annular. The sliding block 21 defines a stopping recess 2171 at a periphery of one end of the positioning hole 217 facing the sliding groove 211. The stopping recess 2171 is configured to accommodate the stopping structure 2413. In the case where the abutting member 241 unlocks a position of the sliding block 21 at the guiding rod 13, the stopping structure 2413 is in close contact with a bottom surface of the stopping recess 2171, the sliding assembly 20 is in an unlocked state, and the sliding assembly 20 is movable. The stopping structure 2413 may be entirely accommodated in the stopping recess 2171, so that the stopping structure 2413 does not occupy a space of the sliding groove 21. In this way, a distance between the guiding rod 13 and the inner surface of the right side wall 2112 of the sliding block 21 is not too large, so that the guiding rod 13 may be in clearance fit with the inner surfaces of the four side walls of the sliding block 21 to ensure smooth movement of the sliding block 21. In the case where the abutting member 241 locks a position of the sliding block 21 at the guiding rod 13, the stopping structure 2413 is in close contact with the guiding rod 13, and the sliding assembly 20 is in a locked state.

It can be understood that, when the stopping structure 2413 abuts against the guiding rod 13 to make the guiding rod 13 be in close contact with the inner surface of the left side wall 2111 of the sliding block 21, there is a first distance between the stopping structure 2413 and the bottom surface of the stopping recess 2171, and in this case, the abutting member 241 locks the sliding block 21 with the guiding rod 13, and the sliding assembly 20 is in the locked state. When the stopping structure 2413 is in close contact with the bottom surface of the stopping recess 2171, there is a second distance between the stopping structure 2413 and the guiding rod 13, and in this case, the abutting member 241 unlocks the sliding block 21 from the guiding rod 13, and the sliding assembly 20 is in the unlocked state. In some implementations, the first distance is equal to the second distance, and a rotation angle of the locking mechanism 24 can be determined according to a thread pitch of the threads on the outer surface of the mounting portion 2411. With the aid of the stopping structure 2413, a rotation range of the locking mechanism 24 can be limited. The rotation angle of the locking mechanism 24 is controlled within a certain range, avoiding excessive rotation cycles of the locking mechanism 24, where excessive rotation cycles may waste time and make it impossible to directly determine whether the locking mechanism 24 is properly rotated into position, and further, excessive rotation cycles during unlocking may also lead to a problem that the locking mechanism 24 is easy to fall off. In some implementations, the rotation angle of the locking mechanism 24 is about 100 degrees.

Referring to FIG. 15 and FIG. 16, the locking structure 24 further includes a locking member 243. The locking member 243 is disposed at one end of the abutting member 241 away from the elastic member 242. The locking member 243 is sleeved on the connection portion 2412 of the abutting member 241. The connection portion 2412 may be connected to the locking member 243 via a screw. The locking member 243 is fixedly connected to the abutting member 241, such that the locking member 243 is rotatable synchronously with the abutting member 241. In this way, the screwing depth of the abutting member 241 can be controlled by operating the locking member 243, so that the abutting member 241 can abut against the guiding rod 13, and the sliding block 21 can be prevented from moving relative to the guiding rod 13.

Further, the locking member 243 includes a long handle end 2431 and a short handle end 2432 opposite the long handle end 2431, so that whether the sliding assembly 20 is in the locked state or the unlocked state may be determined based on an orientation of the long handle end 2431 or an orientation of the short handle end 2432. A radial cross-section of the connection portion 2412 is in a shape of regular polygon. In this way, the orientation of the long handle end 2431 during mounting of the locking member 243 can be adjusted, so that orientations of the long handle ends 2431 of the multiple sliding assemblies 20 in the locked state can be consistent. Specifically, when mount the locking mechanism 24, the abutting member 241 first passes through the positioning hole 217 from the inner surface of the right side wall 2112 of the sliding block 21, then the sliding block 21 passes through the guiding rod 13 and the orientation of the long handle end 2431 is adjusted, and then the locking member 243 is sleeved on the connection portion 2412 of the abutting member 241 and fixed via a screw.

The locking member 243 and the abutting member 241 each has a tolerance due to processing, differences in the orientations of the long handle ends 2431 relative to the sliding assembly 20 in the locked state are inevitable, and thus the orientation of the long handle end 2431 needs to be adjusted when the locking mechanism 24 is locked. In some implementations, the radial cross-section of the connection portion 2412 is in a shape of regular hexagon. Thus, when the abutting member 241 does not rotate, the locking member 243 can be mounted after fine adjustment each time, where the fine adjustment refers to rotating the locking member 243 by 60 degrees. In principle, the larger the number of sides of the regular polygon, the smaller an angle of each adjustment. However, considering the influence of use and the processing cost, the regular hexagon is a relatively suitable shape.

In some implementations, the entire interventional instrument manipulation accessory 100 is made of a metal material. In some implementations, the support frame 10 and the sliding assembly 20 each are made of a biocompatible metal material, such as stainless steel.

Figure 17:
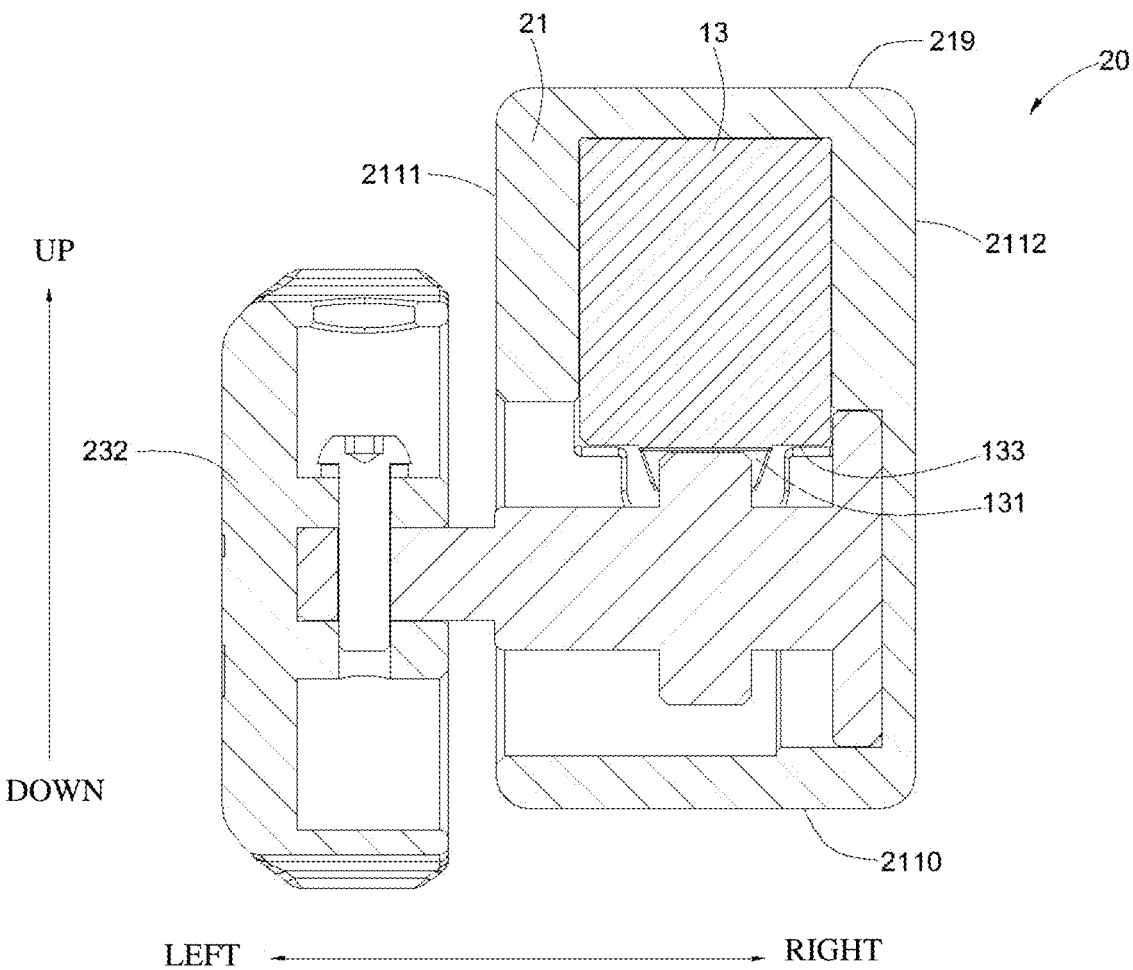
FIG. 17 is a cross-sectional view of the sliding assembly as illustrated in FIG. 4 according to another implementation.

Referring to FIG. 17, the rack 131 can be disposed on the lower surface 133 of the guiding rod 13. In this case, the rack 131 includes multiple segments, and there is no rack 131 at a connection between the guiding rod 13 and the connection post 12. The guiding rod 13 is fixedly connected to the connection post 12 in a detachable manner. In this implementation, the holder 22 is disposed at the upper side wall 219 of the sliding block 21, the rotating member 232 is close to the left side wall 2111 or the right side wall 2112 of the sliding block 21, and the locking mechanism 24 may be disposed at the right side wall 2112 or the left side wall 2111 of the sliding block 21.

Figure 18:
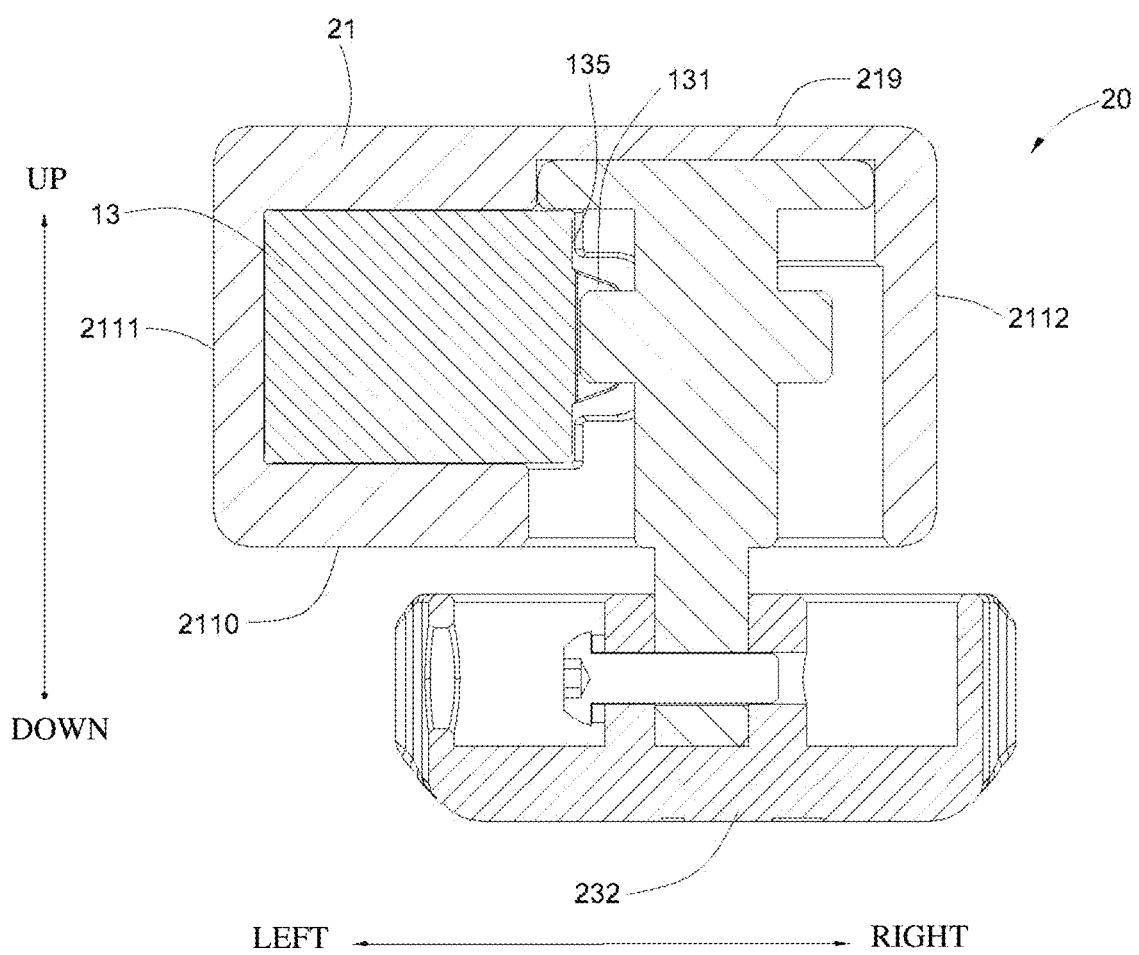
FIG. 18 is a cross-sectional view of the sliding assembly as illustrated in FIG. 4 according to yet another implementation.

Referring to FIG. 18, the rack 131 may be disposed on the right surface 135 of the guiding rod 13. In this case, the rack 131 includes multiple segments that are not disposed at the connection between the guiding rod 13 and the connection post 12. The guiding rod 13 is fixedly connected to the connection post 12 in a detachable manner. In this implementation, the holder 22 is disposed at the upper side wall 219 of the sliding block 21, the rotating member 232 is close to the upper side wall 219 or the lower side wall 2110 of the sliding block 21, and the locking mechanism 24 is disposed at the upper side wall 219 or the lower side wall 2110 of the sliding block 21.

Figure 19:
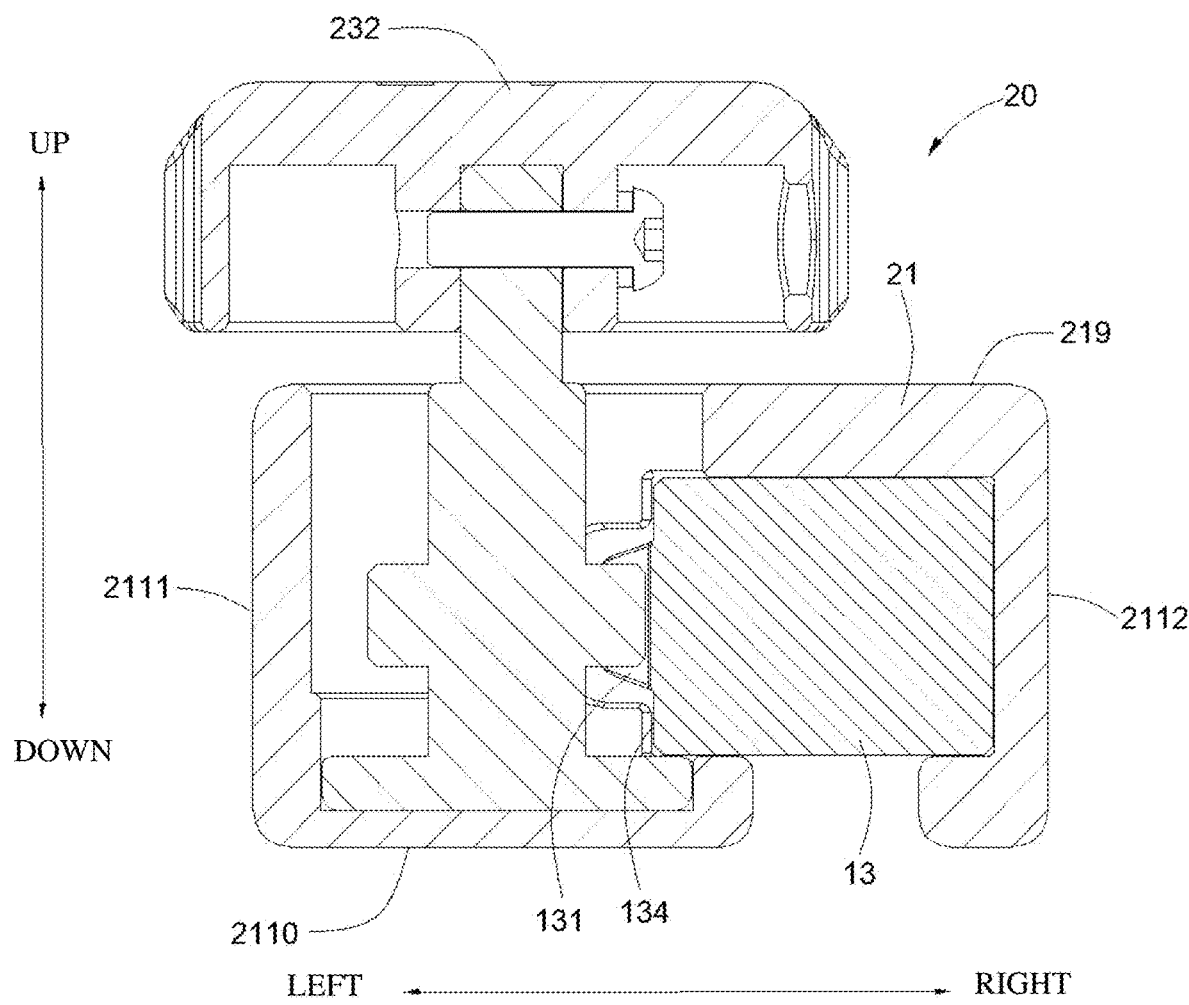
FIG. 19 is a cross-sectional view of the sliding assembly as illustrated in FIG. 4 according to still yet another implementation.

Referring to FIG. 19, the rack 131 may be disposed on the left surface 134 of the guiding rod 13. In this case, the rack 131 is continuous. In this implementation, the holder 22 is disposed at the upper side wall 219 of the sliding block 21, the rotating member 232 is close to the upper side wall 219 or the lower side wall 2110 of the sliding block 21, and the locking mechanism 24 may be disposed at the upper side wall 219 or the lower side wall 2110 of the sliding block 21.

It is noted that, in all implementations of the disclosure, the upper surface 132 of the guiding rod 13 is away from the bottom plate 11, and the lower surface 133 faces the bottom plate 11. The upper side wall 219 of the sliding block 21 is away from the bottom plate 11, and the lower side wall 2110 faces the bottom plate 11.

Figure 20:
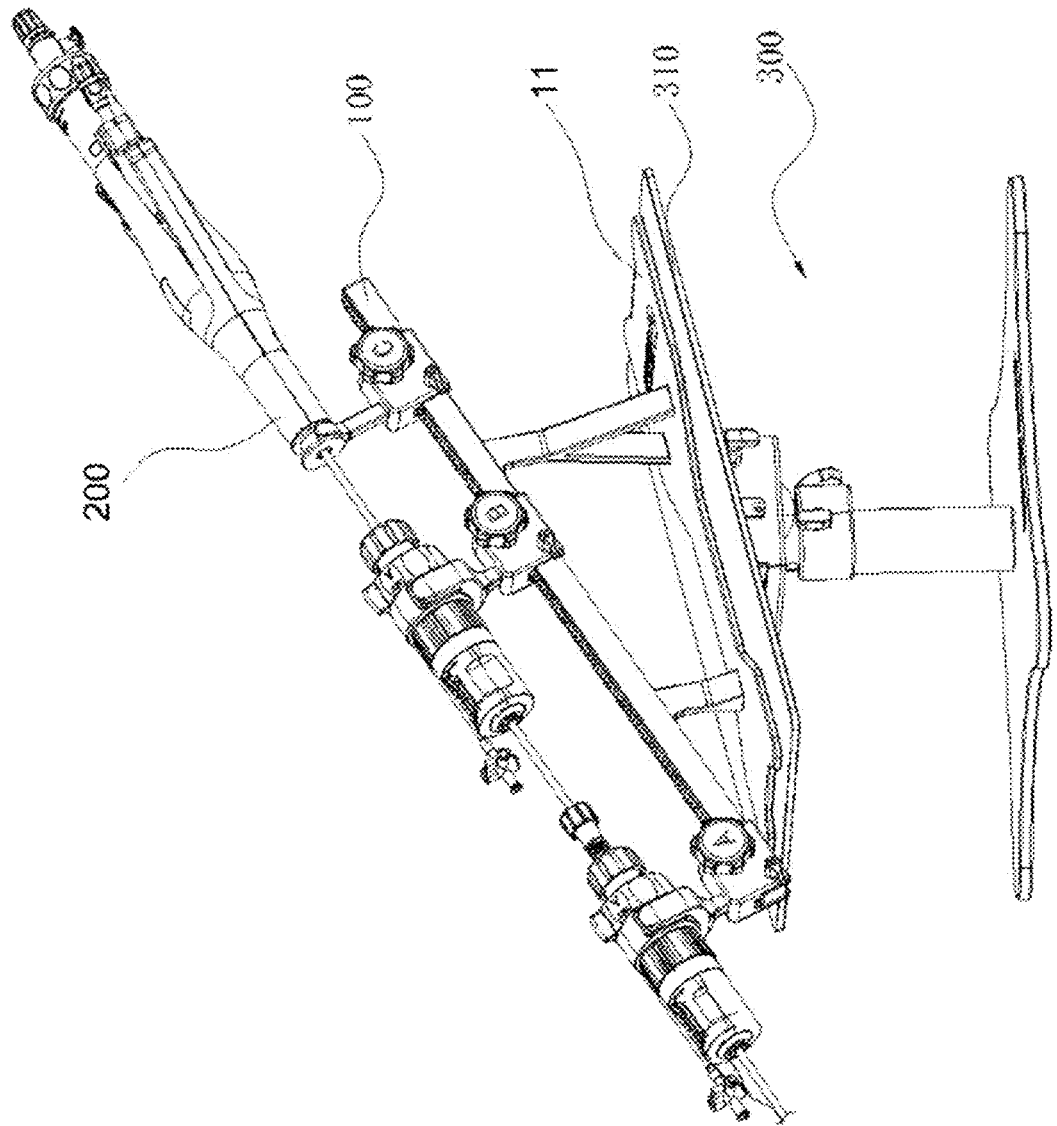
FIG. 20 is a schematic perspective structural view of the interventional medical system as illustrated in FIG. 1, according to another implementation of the disclosure.

Referring to FIG. 20, the interventional medical system also includes a console table 300. The console table 300 includes a tabletop 310 that is adjustable in angle relative to a horizontal direction. During a procedure, the bottom plate 11 of the support frame 10 is connected to the tabletop 310, so that an angle of the interventional instrument manipulation accessory 100 can be adjusted by adjusting an angle of the tabletop 310 relative to the horizontal direction, and accordingly the puncture angle of the interventional instrument 200 fixed to the interventional instrument manipulation accessory 100 is appropriate. Specifically, the tabletop 310 is provided with a fixing member (not illustrated), and in the case where the bottom plate 11 is connected to the tabletop 310, the fixing member is located between the bottom plate 11 and the tabletop 310. The fixing member increases a friction force between the bottom plate 11 and the tabletop 310, so that the bottom plate 11 is connected to the tabletop 310, that is, the bottom plate 11 is fixed to the tabletop 310 by the friction force. In some implementations, the fixing member is a silicone pad that matches the tabletop 310. In a modified implementation, the fixing member may also be a pad layer made of other materials. The fixing member may also be several protrusions and/or recesses arranged on the tabletop 310. In a modified implementation, the bottom plate 11 may also be connected to the tabletop 310 by means of screws, adhesives, and the like. In some implementations, an adjustable angle of the tabletop 310 relative to the horizontal direction ranges from 0 degree to 30 degrees, so that requirements for a puncture angle in most procedures can be met.

It can be understood that the interventional instrument manipulation accessory 100 has an inclination angle due to the structure of the support frame 10, and the interventional instrument manipulation accessory 100 can be directly placed on a platform for use without further adjustment of the puncture angle of the interventional instrument 200.

As an example, the interventional instrument 200 is a mitral valve clamp system, and the usage of the interventional instrument manipulation accessory 100 will be described below. First, the valve clamp manipulation device 210, the bendable sheath 220, and the guiding sheath 230 are mounted at holders 22 of three sliding assemblies 20. Then, the locking mechanism 24 of the sliding assembly 20 is unscrewed, so that the sliding assembly 20 can be moved. And then, the rotating member 232 is rotated to drive the rotating shaft 231 to rotate, and the rotation of the rotating shaft 231 drives a corresponding gear 234 to rotationally mesh with the rack 131, so that the sliding assembly 20 moves relative to the guiding rod 13, and each of the valve clamp manipulation apparatus 210, the bendable sheath 220, and the guiding sheath 230 moves along the guiding rod 13 with a corresponding sliding assembly 20. Finally, when various portions of the interventional instrument 200 are moved to appropriate positions, the locking mechanism 24 may be screwed.

Figure 21:
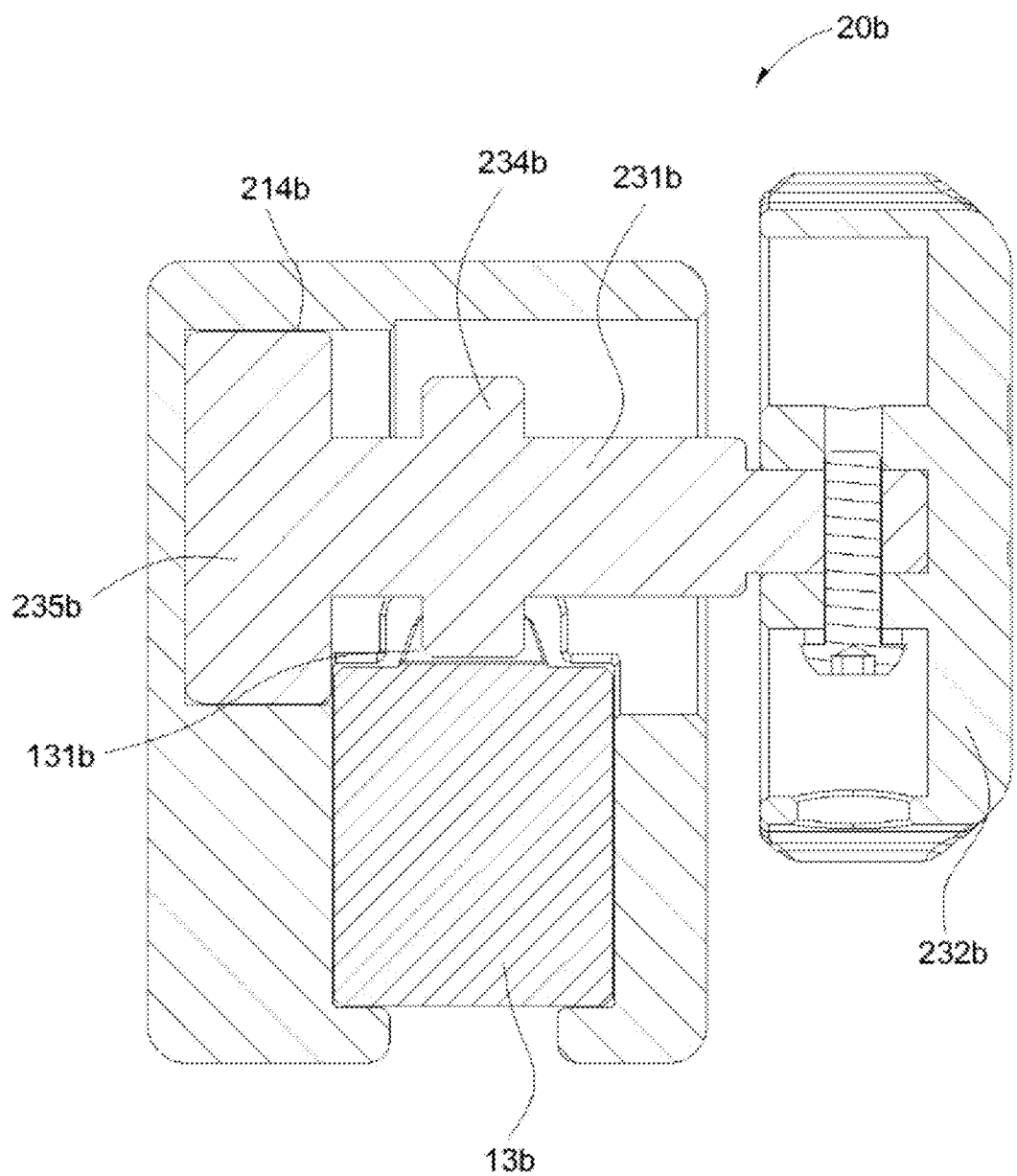
FIG. 21 is a cross-sectional view of a sliding assembly of an interventional instrument manipulation accessory provided in an implementation of the disclosure.
Figure 22:
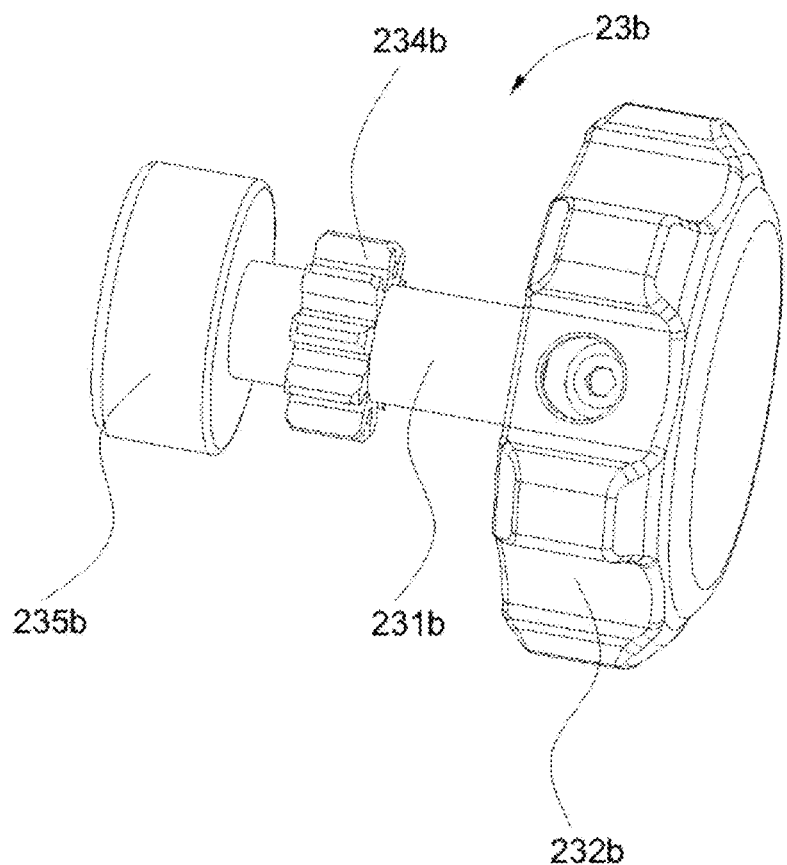
FIG. 22 is a schematic perspective structural view of an adjusting mechanism as illustrated in FIG. 21.

Referring to FIGS. 6, 9, 21, and 22 together, the interventional instrument manipulation accessory as illustrated in FIG. 21 further defines a thickness of the limiting portion 235b of the adjusting mechanism 23b compared with the interventional instrument manipulation accessory 100 as illustrated in FIG. 2 and FIG. 6. The fitting clearance on single side between the limiting portion 235b and the blind hole 214b ranges from 0.02 mm to 0.15 mm, a depth of the blind hole 214b is larger than or equal to the thickness of the limiting portion 235b, the thickness of the limiting portion 235b is directly proportional to the fitting clearance on single side, and the thickness of the limiting portion 235b is greater than 1.15 mm. In this way, the limiting portion 235b is entirely accommodated in the blind hole 214b, and the blind hole 214b may provide a strengthened support for the limiting portion 235b, so that the rotating shaft 231b of the adjusting mechanism 213b can be prevented from inclining toward the guiding rod 13b relative to the axis of the blind hole 214b, where inclining of the rotating shaft 231b may cause a reduction in a meshing clearance between the gear 234b and the rack 131b, resulting in a transmission jam between the gear 234b and the rack 131b.

It can be understood that, in order to ensure that the meshing clearance between the gear 234b and the rack 131b is not too small to generate a transmission jam, the rotating shaft 231b is allowed to have an inclination angle less than 2 degrees relative to the axis of the blind hole 214b. According to the plane geometric relationship, the thickness of the limiting portion 235b needs to be greater than 1.15 mm (which is calculated through an expression: 0.02×2/sin 2°=1.15 mm), so that a smooth meshing between the gear 234b and the rack 131b can be ensured, and accordingly the sliding assembly 20b can smoothly move along the guiding rod 13b in the unlocked state. In some implementations, the fitting clearance on single side between the limiting portion 235b and the blind hole 214b is set to range from 0.05 mm to 0.1 mm. The rotating shaft 231b is allowed to have an inclination angle of less than 1 degree relative to the axis of the blind hole 214b. The thickness of the limiting portion 235b is greater than 5.73 mm (which is calculated through an expression: 0.05×2/sin 1°=5.73 mm).

Further, the larger a distance between the limiting portion 235b and the gear 234b, the smaller the fitting clearance between the gear 234b and the rack 131b. Therefore, the thickness of the limiting portion 235b can be reasonably set in combination with the distance between the limiting portion 235b and the gear 234b.

In consistency with FIG. 6, in FIG. 21, the rack 131b disposed on the upper surface. In consistency with FIGS. 17, 18, and 19, the rack 131b may be disposed on the lower surface, the right surface, or the left surface of the guiding rod 13b. For arrangements of the holder, the rotating member 232b, and the locking mechanism, reference can be made to the implementation manners aforementioned, which will not be repeated herein.

Figure 23:
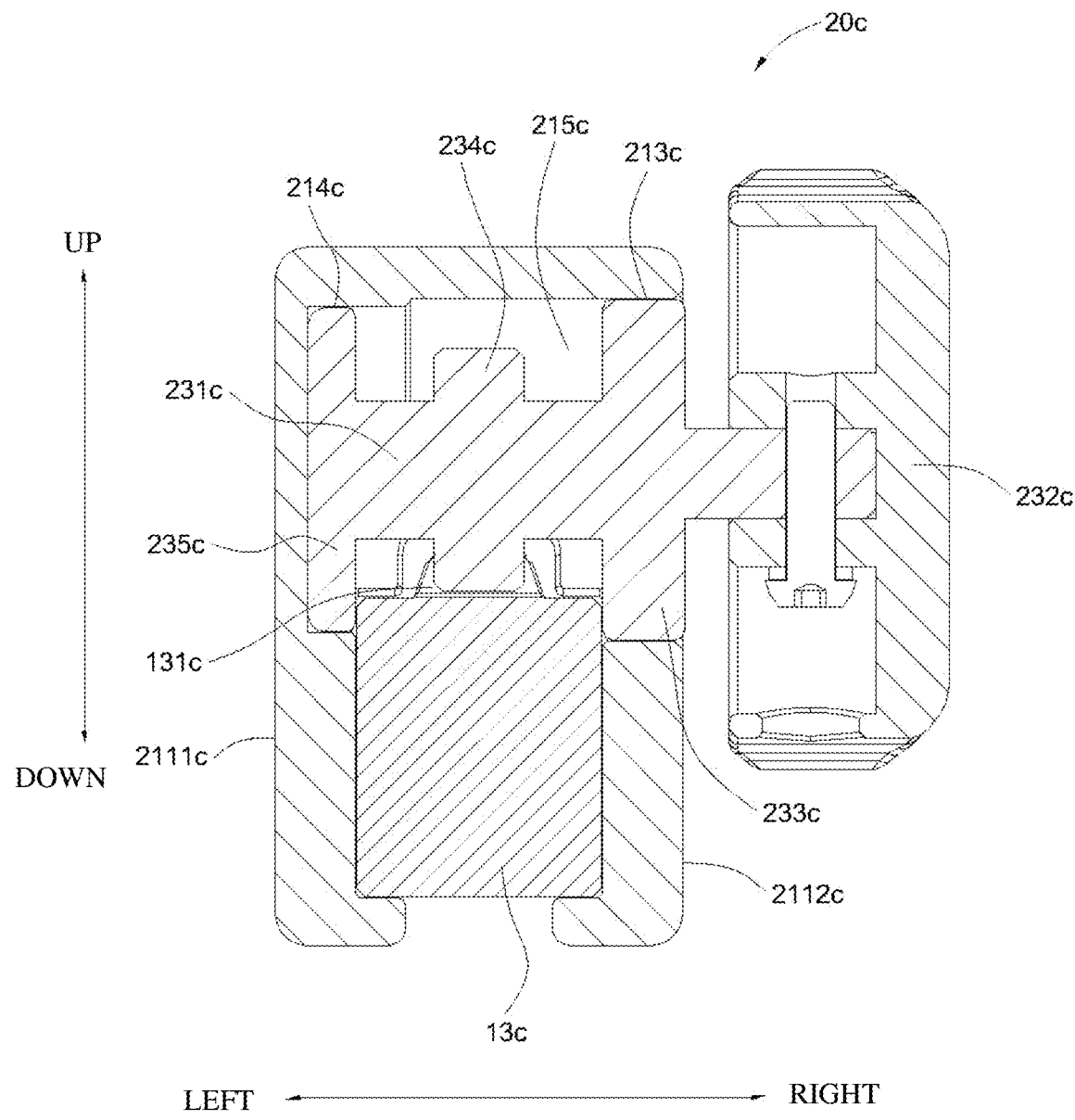
FIG. 23 is a cross-sectional view of a sliding assembly of an interventional instrument manipulation accessory provided in an implementation of the disclosure.

Referring to FIGS. 6, 9, 23, and 24 together, an interventional instrument manipulation accessory as illustrated in FIG. 23 is similar to the interventional instrument manipulation accessory 100 as illustrated in FIG. 2 and FIG. 6 in structure, except that an adjusting mechanism 23c of a sliding assembly 20c as illustrated in FIG. 23 is different from the adjusting mechanism 23 of the sliding assembly 20 as illustrated in FIG. 6 in structure. The following describes in detail a structure of the adjusting mechanism 23c of the interventional instrument manipulation accessory as illustrated in FIG. 23.

Figure 24:
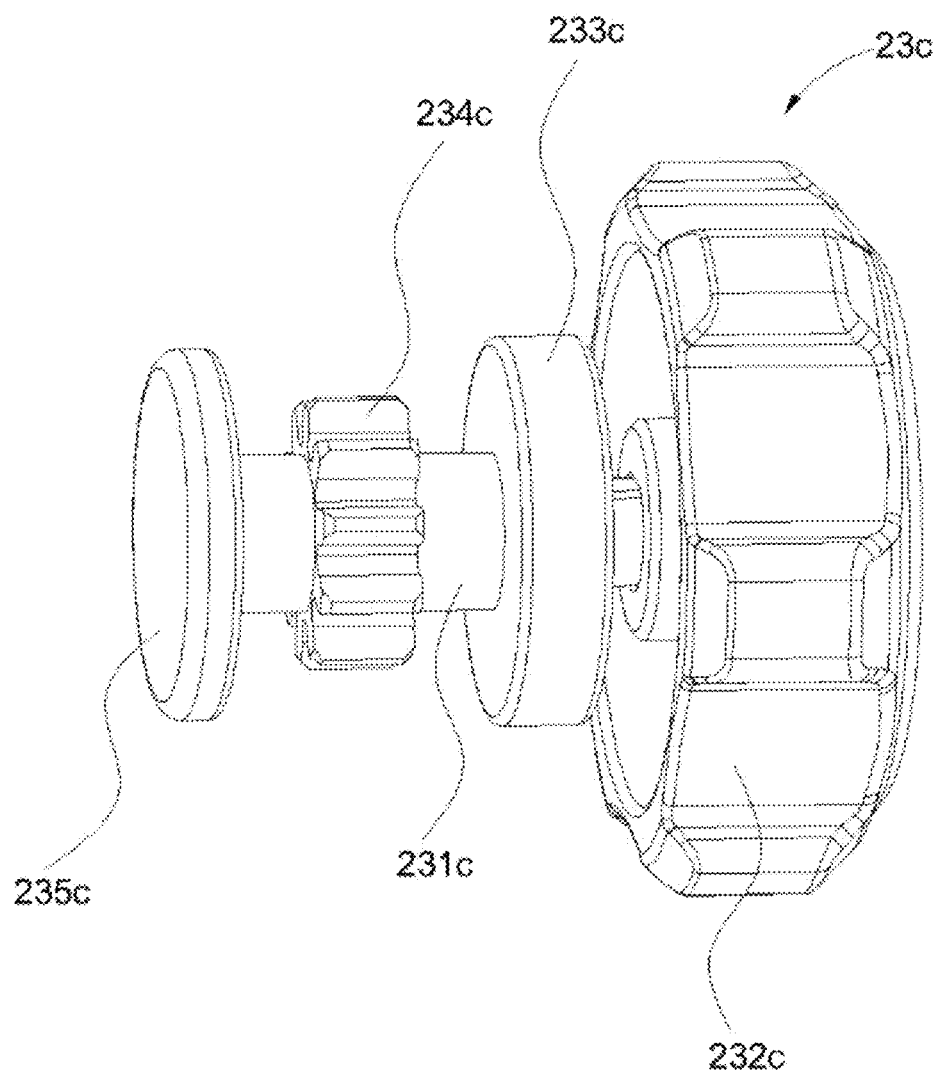
FIG. 24 is a schematic perspective structural view of an adjusting mechanism as illustrated in FIG. 23.

As illustrated in FIG. 24, in consistency with FIG. 9, the adjusting mechanism also includes a limiting portion 235c and a gear 234c. The adjusting mechanism 23c further includes a stabilizing portion 233c fixedly connected to the gear 234c, where the gear 234c is located between the limiting portion 235c and the stabilizing portion 233c. Specifically, the adjusting mechanism 23c further includes a rotating shaft 231c and a rotating member 232c. The limiting portion 235c, the gear 234c, and the stabilizing portion 233c are fixedly sleeved on the rotating shaft 231c. The rotating member 232c is connected to one end of the rotating shaft 231c that extends out of a through hole 213c.

In some implementations, the stabilizing portion 233c may be fixedly sleeved on the rotating shaft 231c through welding, and is spaced apart from the rotating member 232c. The limiting portion 235c, the gear 234c, and the stabilizing portion 233c are coaxial and rotate along with rotation of the rotating shaft 231c. In other implementations, the stabilizing portion 233c may be mounted at the rotating shaft 231c via a bearing or in other assembly manners, so that the stabilizing portion 233c can rotate along with the rotating shaft 231c.

As illustrated in FIG. 23, at least part of the stabilizing portion 233c is rotatably accommodated in the through hole 213c of the accommodating groove 215c, and the stabilizing portion 233c is in clearance fit with the through hole 213c. In this way, the through hole 213c can provide a support for the stabilizing portion 233c, and limit movement of the stabilizing portion 233c in a radial direction of the through hole 213c, so that the rotating shaft 231c can be prevented from inclining toward the guiding rod 13c, a meshing clearance between the gear 234c and the rack 131c can be kept in a reasonable range, and a transmission jam between the gear 234c and the rack 131c can be prevented. Specifically, a fitting clearance on single side between the stabilizing portion 233c and the through hole 213c ranges from 0.02 mm to 0.15 mm. In some implementations, the fitting clearance on single side between the stabilizing portion 233c and the through hole 213c ranges from 0.05 mm to 0.1 mm. It can be understood that the limiting portion 235c fits a blind hole 214c of the sliding block 21c and the stabilizing portion 233c fits the through hole 213c of the sliding block 21c, so that the adjusting mechanism 23c can rotate stably in the sliding block 21c.

In the case where the sliding assembly 20c is mounted at the guiding rod 13c, the stabilizing portion 233c and the limiting portion 235c are respectively located at two opposite sides of the guiding rod 13c. The limiting portion 235c is in clearance fit with the guiding rod 13c, and the stabilizing portion 233c is also in clearance fit with the guiding rod 13c. The guiding rod 13c is sandwiched between the limiting portion 235c and the stabilizing portion 233c. The guiding rod 13c provides a certain support for the limiting portion 235c and the stabilizing portion 233c, so that the adjusting mechanism 23c is not easy to incline and can rotate stably.

In the case where the sliding assembly 20c is mounted at the guiding rod 13c, the gear 234c meshes with and rotates relative to the rack 131c to make the gear 234c move along the rack 131c. The rotation of the gear 234c drives the limiting portion 235c to rotate in the blind hole 214c, so that the limiting portion 235c has a tendency to move in a length direction of the guiding rod 13c, and the rotation of the gear 234c drives the stabilizing portion 233c to rotate in the through hole 213c, so that the stabilizing portion 233c has a tendency to move in the length direction of the guiding rod 13c. However, the blind hole 214c limits movement of the limiting portion 235c, and the through hole 213c limits movement of the stabilizing portion 233c, and thus the limiting portion 235c and the stabilizing portion 233c each apply a pushing force in the length direction of the guiding rod 13c to the sliding block 21c, so that sliding assembly 20c can be moved on the guiding rod 13c. As the stabilizing portion 233c and the limiting portion 235c respectively push two opposite side walls (a right side wall 2112c and a left side wall 2111c as illustrated in the figure) of the sliding block 21c to move the sliding assembly 20c, the sliding assembly 20c can be moved stably and easily.

In some implementations, the limiting portion 235c is cylindrical and the stabilizing portion 233c is cylindrical. A diameter of the limiting portion 235c is larger than an outer diameter of the gear 234c, and a diameter of the stabilizing portion 234c is larger than the diameter of the limiting portion 235c. In this way, it can avoid a jam caused by an inclining of the rotating shaft 231c in the case where the adjusting mechanism 23c is disassembled and assembled, which facilitates quick disassembly and assembly of the adjusting mechanism 23c. In other implementations, the diameter of limiting portion 235c may be equal to the diameter of the stabilizing portion 233c as long as both the diameter of the limiting portion 235c and the diameter of the stabilizing portion 233c are larger than the diameter of the gear 234c, so that the limiting portion 235c can be limited between the guiding rod 13c and a side wall of the sliding block 21c without affecting the meshing between the gear 234c and the rack 131c.

In consistency with FIG. 6, in FIG. 23, the rack 131c disposed on the upper surface. In consistency with FIGS. 17, 18, and 19, the rack 131b may be disposed on the lower surface, the right surface, or the left surface of the guiding rod 13c. For arrangements of the holder, the rotating member 232c, and the locking mechanism, reference can be made to the implementation manners aforementioned, which will not be repeated herein. A thickness of the limiting portion 235c in FIG. 23 may also be defined as the implementation method in FIG. 21, which will not be repeated herein.

Figure 25:
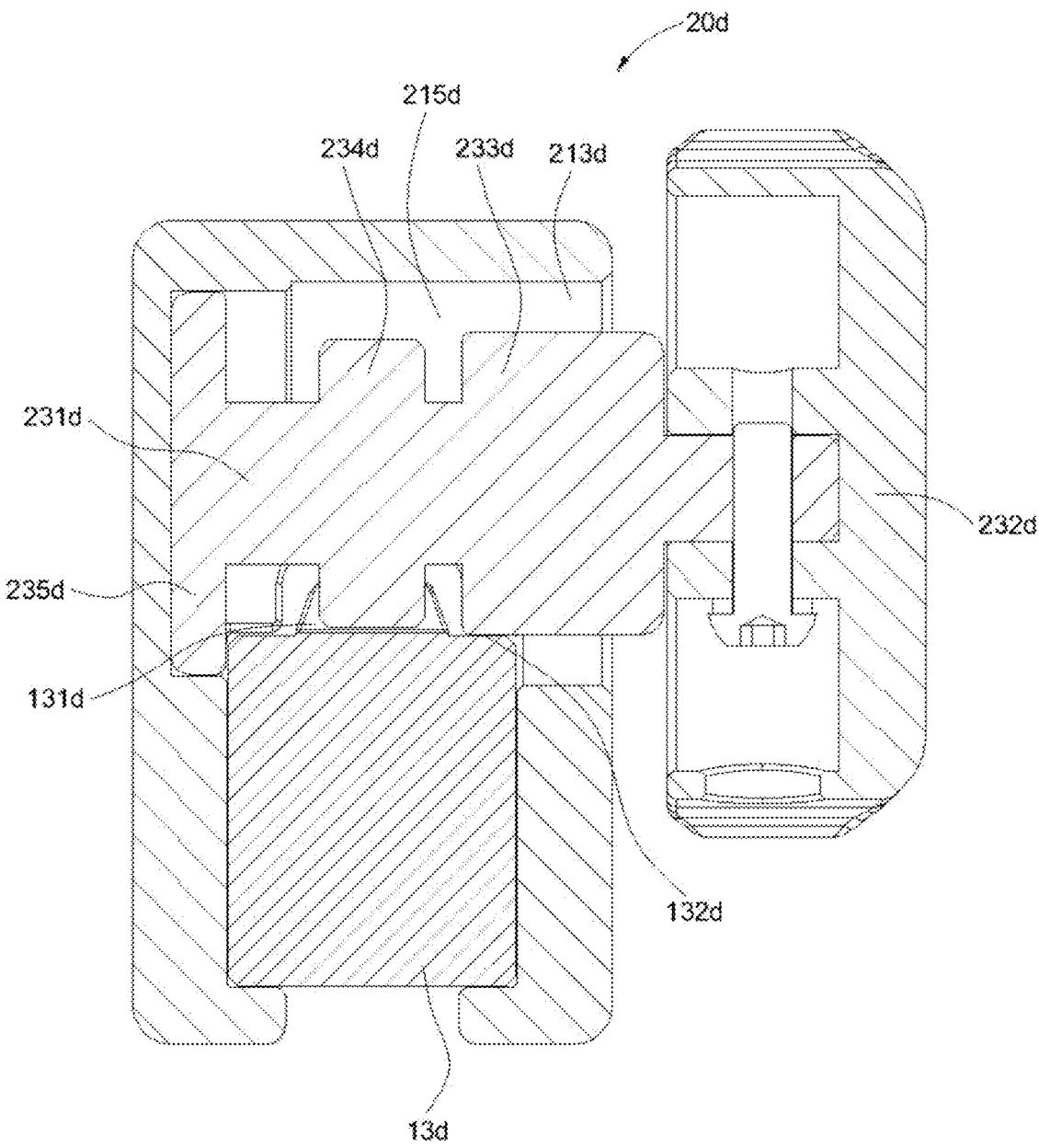
FIG. 25 is a cross-sectional view of a sliding assembly of an interventional instrument manipulation accessory provided in an implementation of the disclosure.
Figure 26:
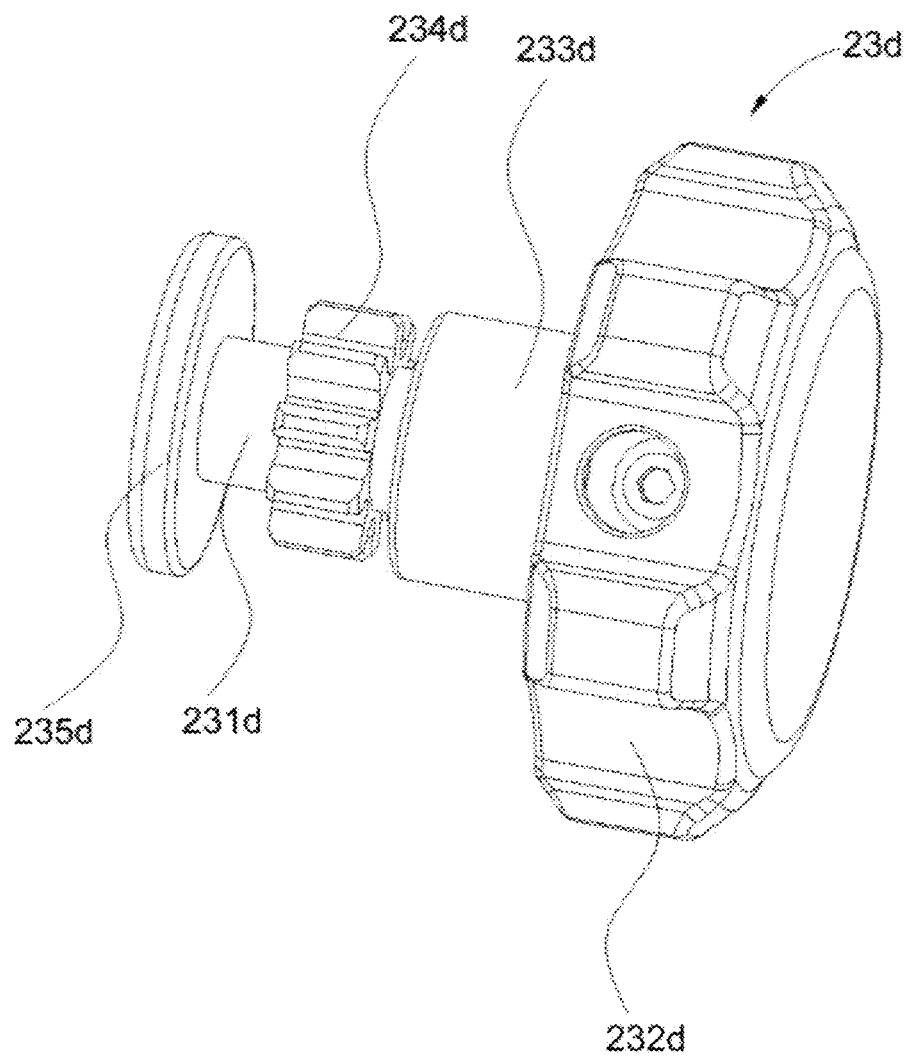
FIG. 26 is a schematic perspective structural view of an adjusting mechanism as illustrated in FIG. 25.

Referring to FIGS. 6, 9, 25, and 26 together, an interventional instrument manipulation accessory as illustrated in FIG. 25 is similar to the interventional instrument manipulation accessory 100 as illustrated in FIG. 2 and FIG. 6 in structure, except that an adjusting mechanism 23d of a sliding assembly 20d as illustrated in FIG. 25 is different from the adjusting mechanism 23 of the sliding assembly 20 as illustrated in FIG. 6 in structure. The following describes in detail a structure of an adjusting mechanism 23d of the interventional instrument manipulation accessory as illustrated in FIG. 25.

In consistency with FIG. 6, the adjusting mechanism 23d as illustrated in FIG. 25 also includes a limiting portion 235d and a gear 234d. The adjusting mechanism 23 further includes a stabilizing portion 233d fixedly connected to the gear 234d. The gear 234d is located between the limiting portion 235d and the stabilizing portion 233d. At least part of the stabilizing portion 233d is rotatably accommodated in a through hole 213d of the accommodating groove 215d. Specifically, the adjusting mechanism 23d further includes a rotating shaft 231d and a rotating member 232d, where the limiting portion 235d, the gear 234d, and the stabilizing portion 233d are fixedly sleeved on the rotating shaft 231d, and the rotating member 232d is connected to one end of the rotating shaft 231d extending out of the through hole 213d. In some implementations, the stabilizing portion 233d may be fixedly sleeved on the rotating shaft 231d by welding. The limiting portion 235d, the gear 234d, and the stabilizing portion 233d are coaxial and rotate along with rotation of the rotating shaft 231d. In other implementations, the stabilizing portion 233d may be mounted at the rotating shaft 231d via a bearing or in other assembly manners, so that the stabilizing portion 233d can rotate along with the rotating shaft 231d.

In some implementations, the guiding rod 13d includes a first surface, and the rack is disposed on the first surface. The first surface may be an upper surface, a lower surface, a left surface, or a right surface of the guiding rod 13d. An example that the first surface is the upper surface of the guiding rod 13d is taken for illustration as follows. The stabilizing portion 233d is cylindrical, and an outer circumferential wall of the stabilizing portion 233d is in rotational contact with the upper surface of the guiding rod 13d. Specifically, a radius of the stabilizing portion 233d is equal to a distance from an axis of the rotating shaft 231d to the upper surface 132d of the guiding rod 13d when the axis of the rotating shaft 231d is in the horizontal position. The outer circumferential wall of the stabilizing portion 233d is in contact with the upper surface of the guiding rod 13d, but does not limit the rotation of the stabilizing portion 233d relative to the upper surface 132d of the guiding rod 13d along with rotation of the rotating shaft 231d. In this way, the outer circumferential wall of the stabilizing portion 233d is in rotational contact with the upper surface of the guiding rod 13d, so that the rotating shaft 231d can be prevented from inclining toward the guiding rod 13d, a meshing clearance between the gear 234d and the rack 131d can be kept within a reasonable range, and a transmission jam between the gear 234d and the rack 131d can be prevented.

In consistency with FIG. 6, in FIG. 25, the rack 131d is disposed on the upper surface. In consistency with FIGS. 17, 18, and 19, the rack 131b may be disposed on the lower surface, the right surface, or the left surface of the guiding rod 13d. For arrangements of the holder, the rotating member 232d, and the locking mechanism, reference can be made to the aforementioned implementation manners, which will not be repeated herein. A thickness of the limiting portion 235d in FIG. 25 may also be defined as the implementation method in FIG. 21, which will not be repeated herein.

Figure 27:
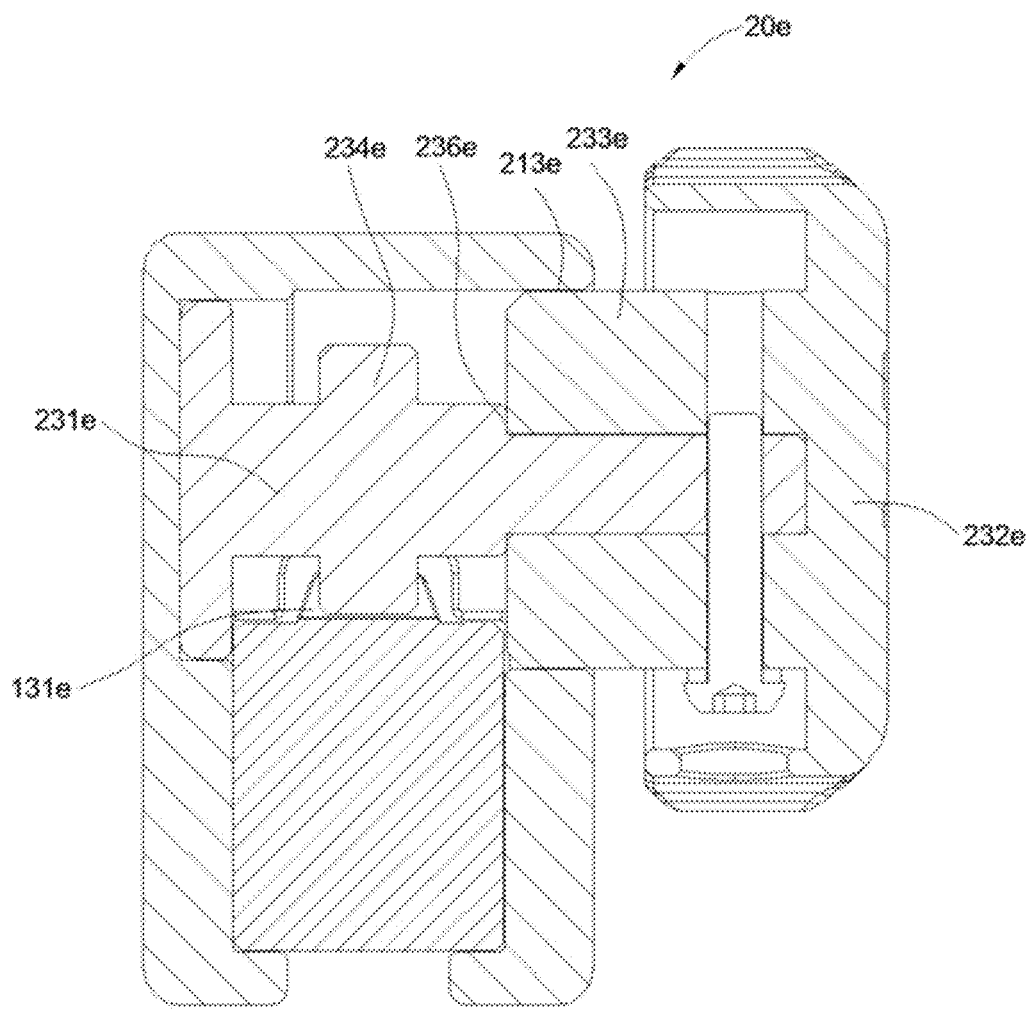
FIG. 27 is a cross-sectional view of a sliding assembly of an interventional instrument manipulation accessory provided in an implementation of the disclosure.
Figure 28:
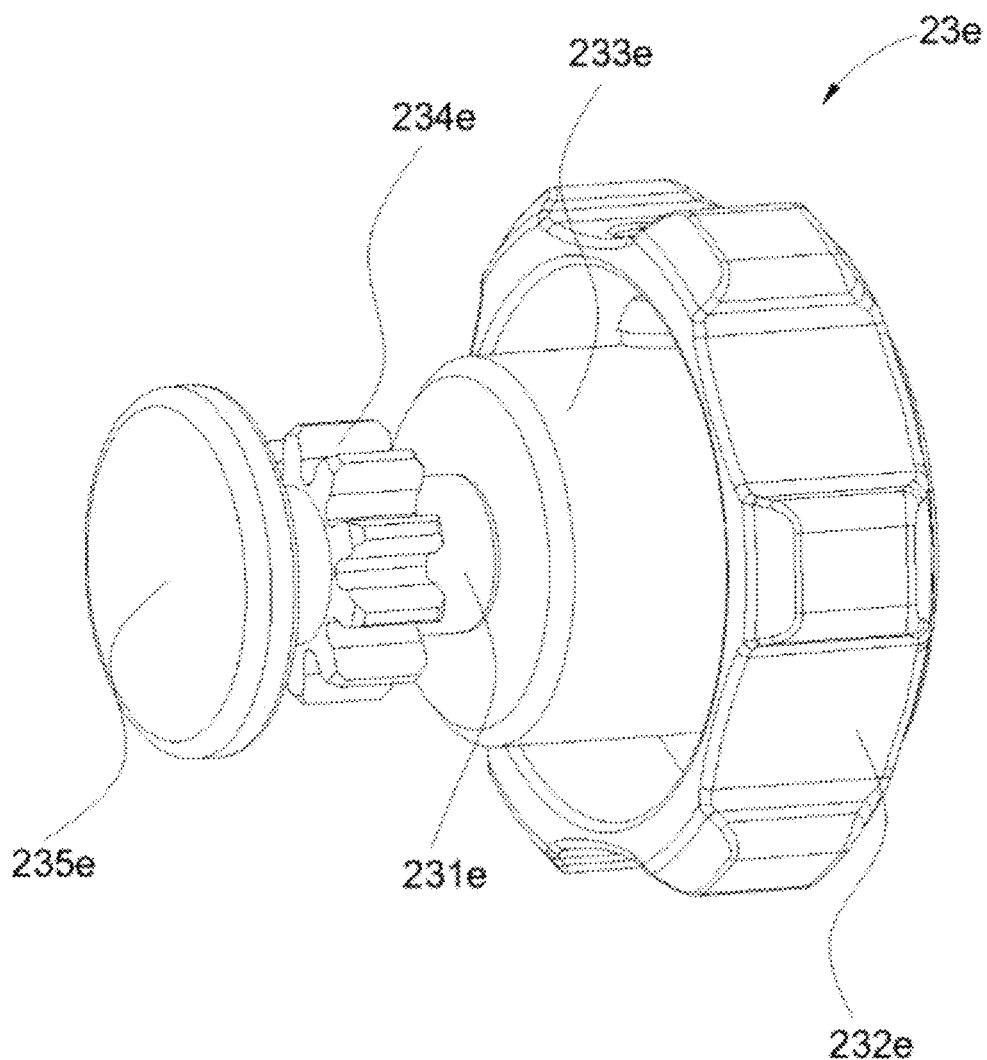
FIG. 28 is a schematic perspective structural view of an adjusting mechanism as illustrated in FIG. 27.

Referring to FIGS. 23, 24, 27, and 28 together, an interventional instrument manipulation accessory as illustrated in FIG. 27 is similar to the interventional instrument manipulation accessory as illustrated in FIG. 23 in structure, except that an adjusting mechanism 23e of a sliding assembly 20e as illustrated in FIG. 27 is different from the adjusting mechanism 23c of the sliding assembly 20c as illustrated in FIG. 23 in structure. In FIG. 23, the stabilizing portion 233c and the rotating member 232c of the adjusting mechanism 23c are separately arranged at intervals. In FIG. 27, the stabilizing portion 233e and the rotating member 232e of the adjusting mechanism 23e are integrally connected, that is, the stabilizing portion 233e and the rotating member 232e are integrated. The stabilizing portion 233e is cylindrical. Part of the stabilizing portion 233e is rotatably accommodated in the through hole 213e, and another part of the stabilizing portion 233e extends out of the through hole 213e, so that the rotating member 232e can be prevented from contacting the side wall of the sliding block, where a contact between the rotating member 232e and the side wall of the sliding block may make the rotating member 232e non-rotatable. In consistency with FIG. 23, in FIG. 27, the stabilizing portion 233e is in clearance fit with the through hole 213e, so that a transmission jam between the gear 234e and the rack 131e can be prevented.

In some implementations, the stabilizing portion 233e defines an axial mounting hole and a radial mounting hole. One end of the rotating shaft 231e passes through the axial mounting hole, the radial mounting hole is aligned with the mounting hole of the rotating shaft 231e, and the rotating shaft 231e is fixedly connected to the stabilizing portion 233e by fasteners such as screws and pins, thereby ensuring that the rotating shaft 231e can rotate along with the rotation of the rotating member 232e.

Further, the rotating shaft 231e is provided with a stepped portion 236e in an axial direction. A distance between an end face of one end of the rotating shaft 231e extending through the axial mounting hole of the stabilizing portion 233e and the stepped portion 236e in the axial direction is equal to a depth of the axial mounting hole of the stabilizing portion 233e. In the case where the stabilizing portion 233e is fitted with the rotating shaft 231e, the stepped portion 236e contacts an end face of the stabilizing portion 233e, so that it is easy to align the radial mounting hole of the stabilizing portion 233e with the mounting hole of the rotating shaft 231e, and a contact area between the rotating shaft 231e and the stabilizing portion 233e is also increased to improve the connection stability between the rotating shaft 231e and the stabilizing portion 233e.

The above is the implementation manners of the implementations of the disclosure. It is pointed out that those of ordinary skill in the art may also make several improvements and modifications without departing from the principle of the implementations of the disclosure. These improvements and modifications shall fall within the scope of protection of the disclosure.

What is claimed is:

1. An interventional instrument manipulation accessory, comprising:
    a support frame, wherein the support frame comprises a guiding rod, and the guiding rod is provided with at least one rack in a length direction of the guiding rod; and
    at least one sliding assembly, wherein each sliding assembly comprises a sliding block and an adjusting mechanism detachably disposed at the sliding block, and the adjusting mechanism comprises a limiting portion and a gear fixedly connected to the limiting portion; wherein
    when the sliding assembly is in a case where the sliding assembly is mounted at the guiding rod, the sliding block is sleeved on the guiding rod, the gear meshes with the at least one rack, and the limiting portion is limited between the guiding rod and a side wall of the sliding block; and when the sliding assembly is in a case where the sliding assembly is detached from the guiding rod, the adjusting mechanism is operable to be detached from the sliding block.

2. The interventional instrument manipulation accessory of claim 1, wherein the sliding block defines a sliding groove and an accommodating groove in communication with the sliding groove, and the adjusting mechanism is detachably mounted in the accommodating groove;

when the sliding assembly is in the case where the sliding assembly is mounted at the guiding rod, the guiding rod extends through the sliding groove, the gear is accommodated in the accommodating groove and the sliding groove and meshes with the at least one rack, and the limiting portion is rotatably accommodated in the accommodating groove.

3. The interventional instrument manipulation accessory of claim 2, wherein a through hole is defined at one end of the accommodating groove, a blind hole is defined at the other end of the accommodating groove, wherein the limiting portion is operable to pass through the through hole to be rotatably accommodated in the blind hole.

4. The interventional instrument manipulation accessory of claim 3, wherein one of the through hole and the blind hole is defined at a left side wall of the sliding block, and the other one of the through hole and the blind hole is defined at a right side wall of the sliding block.

5. The interventional instrument manipulation accessory of claim 3, wherein the adjusting mechanism further comprises a rotating shaft, wherein both the limiting portion and the gear are fixed to the rotating shaft, and at least part of the rotating shaft is rotatably inserted into the accommodating groove.

6. The interventional instrument manipulation accessory of claim 5, wherein the adjusting mechanism further comprises a rotating member, wherein one end of the rotating shaft extends out of the through hole and is connected to the rotating member, and the other end of the rotating shaft away from the rotating member is fixedly connected to the limiting portion.

7. The interventional instrument manipulation accessory of claim 3, wherein a fitting clearance on single side between the limiting portion and the blind hole ranges from 0.02 mm to 0.15 mm, a depth of the blind hole is larger than or equal to a thickness of the limiting portion, the thickness of the limiting portion is directly proportional to the fitting clearance on single side, and the thickness of the limiting portion is greater than 1.15 mm.

8. The interventional instrument manipulation accessory of claim 2, wherein the accommodating groove has a gear fitting hole, wherein the gear fitting hole is in communication with the sliding groove, and the gear is operable to pass through the gear fitting hole to mesh with the at least one rack.

9. The interventional instrument manipulation accessory of claim 5, wherein the adjusting mechanism further comprises a stabilizing portion fixedly connected to the rotating shaft, wherein the gear is located between the limiting portion and the stabilizing portion, at least part of the stabilizing portion is rotatably accommodated in the through hole, and the stabilizing portion is in clearance fit with the through hole.

10. The interventional instrument manipulation accessory of claim 5, wherein the adjusting mechanism further comprises a stabilizing portion fixedly connected to the rotating shaft, wherein the gear is located between the limiting portion and the stabilizing portion, and the guiding rod is sandwiched between the limiting portion and the stabilizing portion.

11. The interventional instrument manipulation accessory of claim 9, wherein both the limiting portion and the stabilizing portion are cylindrical, a diameter of the limiting portion is larger than an outer diameter of the gear, and a diameter of the stabilizing portion is larger than the diameter of the limiting portion.

12. The interventional instrument manipulation accessory of claim 3, wherein the adjusting mechanism further comprises a stabilizing portion fixedly connected to the gear, the gear is located between the limiting portion and the stabilizing portion, and at least part of the stabilizing portion is rotatably accommodated in the through hole;

the guiding rod has a first surface, wherein the at least one rack is disposed on the first surface, the stabilizing portion is cylindrical, and an outer circumferential wall of the stabilizing portion is in rotational contact with the first surface.

13. The interventional instrument manipulation accessory of claim 2, wherein the sliding assembly further comprises a locking mechanism disposed at the sliding block, wherein the locking mechanism comprises an abutting member, and the abutting member is operable to abut against the guiding rod to lock the sliding block with the guiding rod and is operable to move away from the guiding rod to unlock the sliding block from the guiding rod; and the sliding block defines a positioning hole in communication with the sliding groove, wherein the abutting member extends through the positioning hole, and the abutting member is operable to move along an axis of the positioning hole to abut against the guiding rod or move away from the guiding rod.

14. The interventional instrument manipulation accessory of claim 13, wherein the locking mechanism further comprises an elastic member connected to the abutting member, wherein the elastic member elastically abuts against the guiding rod.

15. The interventional instrument manipulation accessory of claim 14, wherein the abutting member comprises a mounting portion facing the sliding groove and a connection portion away from the sliding groove, wherein the mounting portion defines a mounting hole, and the elastic member is partially accommodated in the mounting hole.

16. The interventional instrument manipulation accessory of claim 15, wherein the locking mechanism further comprises a locking member, wherein the locking member is sleeved on the connection portion, and the locking member is fixedly connected to the abutting member, such that the locking member is rotatable synchronously with the abutting member.

17. The interventional instrument manipulation accessory of claim 15, wherein the mounting portion is in threaded connection with the positioning hole, and is provided with a stopping structure protruding from one end of the mounting portion facing the sliding groove, and the sliding block defines a stopping recess at a periphery of one end of the positioning hole facing the sliding groove;

when the sliding block is locked with the guiding rod through the abutting member, the stopping structure is in close contact with the guiding rod; and when the sliding block is unlocked from the guiding rod through the abutting member, the stopping structure is in close contact with a bottom surface of the stopping recess.

18. The interventional instrument manipulation accessory of claim 1, wherein the sliding assembly further comprises a holder, wherein the holder is disposed at the sliding block and used for detachable connection with an interventional instrument.

19. An interventional medical system, comprising:
an interventional instrument; and
an interventional instrument manipulation accessory, wherein the interventional instrument is detachably connected to the sliding assembly, and the interventional instrument manipulation accessory comprises a support frame and at least one sliding assembly, wherein
the support frame comprises a guiding rod, and the guiding rod is provided with at least one rack in a length direction of the guiding rod;
each sliding assembly comprises a sliding block and an adjusting mechanism detachably disposed at the sliding block, and the adjusting mechanism comprises a limiting portion and a gear fixedly connected to the limiting portion;
when the sliding assembly is in a case where the sliding assembly is mounted at the guiding rod, the sliding block is sleeved on the guiding rod, the gear meshes with the at least one rack, and the limiting portion is limited between the guiding rod and a side wall of the sliding block; and
when the sliding assembly is in a case where the sliding assembly is detached from the guiding rod, the adjusting mechanism is operable to be detached from the sliding block.

20. The interventional medical system of claim 19, wherein the sliding block defines a sliding groove and an accommodating groove in communication with the sliding groove, and the adjusting mechanism is detachably mounted in the accommodating groove;
when the sliding assembly is in the case where the sliding assembly is mounted at the guiding rod, the guiding rod extends through the sliding groove, the gear is accommodated in the accommodating groove and the sliding groove and meshes with the at least one rack, and the limiting portion is rotatably accommodated in the accommodating groove.

* * * * *